(12) United States Patent
Shirakawa

(10) Patent No.: US 11,599,536 B2
(45) Date of Patent: Mar. 7, 2023

(54) INFORMATION OUTPUT DEVICE, INFORMATION OUTPUT METHOD, AND INFORMATION OUTPUT PROGRAM

(71) Applicant: SOPPRA CORPORATION, Osaka (JP)

(72) Inventor: Motomitsu Shirakawa, Osaka (JP)

(73) Assignee: SOPPRA CORPORATION, Osaka (JP)

( * ) Notice: Subject to any disclaimer, the term of this patent is extended or adjusted under 35 U.S.C. 154(b) by 0 days.

(21) Appl. No.: 17/771,378

(22) PCT Filed: Aug. 18, 2020

(86) PCT No.: PCT/JP2020/031076
§ 371 (c)(1),
(2) Date: Apr. 22, 2022

(87) PCT Pub. No.: WO2021/079597
PCT Pub. Date: Apr. 29, 2021

(65) Prior Publication Data
US 2022/0374422 A1  Nov. 24, 2022

(30) Foreign Application Priority Data

Oct. 23, 2019 (JP) .............................. JP2019-192985
Oct. 31, 2019 (JP) .............................. JP2019-199341

(51) Int. Cl.
*G06F 16/242* (2019.01)
*G06F 16/2452* (2019.01)
(Continued)

(52) U.S. Cl.
CPC ...... *G06F 16/24522* (2019.01); *G06F 16/242* (2019.01); *G06F 16/243* (2019.01);
(Continued)

(58) Field of Classification Search
CPC ............. G06F 16/24522; G06F 16/242; G06F 16/243; G06F 16/2453; G06F 16/248;
(Continued)

(56) References Cited

U.S. PATENT DOCUMENTS 6,847,966 B1 * 1/2005 Sommer ............. G06F 16/3347
707/999.005
9,858,925 B2 * 1/2018 Gruber .................... G10L 15/18
(Continued)

FOREIGN PATENT DOCUMENTS

CN       102253984 A   11/2011
JP       2002108915 A   4/2002
(Continued)

OTHER PUBLICATIONS

Tur et al. Spoken Language Understanding: Systems for Extracting Semantic Information From Speech, 2011, John Wiley & Sons, Ltd., pp. 1-444 (Year: 2011).*
(Continued)

*Primary Examiner* — Jorge A Casanova
(74) *Attorney, Agent, or Firm* — Holtz, Holtz & Volek PC

(57) ABSTRACT

An information output receives a conversational sentence, parameterizes one or more entities included in one or more received conversational sentences, searches a database using the to acquire a search result, and outputs the search result.

3 Claims, 10 Drawing Sheets

(51) Int. Cl.
*G06F 16/2453* (2019.01)
*G06F 16/248* (2019.01)
*G06F 16/332* (2019.01)
*G06F 16/9032* (2019.01)

(52) U.S. Cl.
CPC ........ *G06F 16/248* (2019.01); *G06F 16/2453* (2019.01); *G06F 16/3329* (2019.01); *G06F 16/90332* (2019.01)

(58) Field of Classification Search
CPC .. G06F 16/3329; G06F 16/90332; G06F 3/16; G10L 15/26
See application file for complete search history.

(56) References Cited

U.S. PATENT DOCUMENTS

| | | | |
|---|---|---|---|
| 10,170,123 B2* | 1/2019 | Orr | G06F 3/167 |
| 11,048,881 B2* | 6/2021 | Chittimalli | G06N 20/00 |
| 11,195,524 B2* | 12/2021 | Mukherjee | G10L 15/1815 |
| 11,323,570 B1* | 5/2022 | Lamba | G06K 9/6263 |
| 2014/0196092 A1 | 7/2014 | Chung et al. | |
| 2014/0236570 A1* | 8/2014 | Heck | G06F 16/3329 704/9 |
| 2021/0064640 A1* | 3/2021 | Taki | G06F 40/295 |
| 2021/0174806 A1* | 6/2021 | Krishnaswamy | G10L 15/16 |
| 2021/0201144 A1* | 7/2021 | Jonnalagadda | G06N 3/0454 |
| 2021/0303578 A1* | 9/2021 | Dua | G06F 16/2228 |
| 2021/0327415 A1* | 10/2021 | Park | G10L 15/197 |

FOREIGN PATENT DOCUMENTS

| | | |
|---|---|---|
| JP | 2002342361 A | 11/2002 |
| JP | 2006004274 A | 1/2006 |
| JP | 2014132464 A | 7/2014 |
| JP | 2019012439 A | 1/2019 |

OTHER PUBLICATIONS

Chinese Office Action (and English language translation thereof) dated Aug. 3, 2022 issued in counterpart Chinese Application No. 202080073710.0.
International Search Report (ISR) (and English translation thereof) dated Sep. 15, 2020, issued in International Application No. PCT/JP2020/031076.
Written Opinion dated Sep. 15, 2020, issued in International Application No. PCT/JP2020/031076.
Japanese Office Action (and English language translation thereof) dated Mar. 10, 2020 issued in Japanese Application No. 2019-199341.
Japanese Office Action (and English language translation thereof) dated Sep. 8, 2020 issued in Japanese Application No. 2019-199341.

* cited by examiner

Fig. 5

| ID | TABLE INFORMATION ||||||
| --- | --- | --- | --- | --- | --- | --- |
| | TABLE IDENTIFIER | TABLE |||||
| 1 | MST_SHAIN | SHAIN_CODE | SHAIN_NAME | ... | ... | ... |
| | | 1 | ICHIRO NAKAMURA | ... | ... | ... |
| | | 2 | JIRO OTSUKA | ... | ... | ... |
| | | ⋮ | ⋮ | ... | ... | ... |
| 2 | MST_GYOUMU | GYOUMU_ID | GYOUMU_NAME | ... | ... | ... |
| | | a | MATTER A | ... | ... | ... |
| | | b | MATTER B | ... | ... | ... |
| | | ⋮ | ⋮ | ... | ... | ... |
| 3 | TRN_TIME_CARD | TIME_CARD_DATE | SHAIN_CODE | ZIKANGAI_TIME | TOTAL_TIME | GYOUMU_ID |
| | | 4/1 | 1 | 2 | 10 | a |
| | | 4/1 | 2 | 1 | 9 | b |
| | | ⋮ | ⋮ | ⋮ | ⋮ | ⋮ |
| | | 4/2 | 1 | 1 | 9 | a |
| | | 4/2 | 2 | 0 | 8 | b |
| | | ⋮ | ⋮ | ⋮ | ⋮ | ⋮ |
| | | 4/30 | 1 | 3 | 11 | b |
| | | 4/30 | 2 | 2 | 10 | b |
| | | ⋮ | ⋮ | ⋮ | ⋮ | ⋮ |

Fig. 6

| ID | INTENT ||
| --- | --- | --- |
| | INTENT NAME | ACTION NAME |
| 1 | OVERTIME HOURS QUERY INTENT | OVERTIME HOURS QUERY |
| 2 | WORKING HOURS DATA QUERY INTENT | WORKING HOURS DATA QUERY |
| ⋮ | ⋮ | ⋮ |

*Fig. 7*

| ID | API INFORMATION |
|----|----------------|
| 1 | Search_OVERTIME HOURS (EMPLOYEE 1, DATE 1, ...) |
| 2 | Search_OVERTIME HOURS (EMPLOYEE 1, DATE 2, ...) |
| 3 | Search_OVERTIME HOURS (EMPLOYEE 2, DATE 1, ...) |
| | ⋮ |

FIRST PARAMETER — SECOND PARAMETER

*Fig. 8*

| ACTION NAME | API INFORMATION |
|-------------|----------------|
| OVERTIME HOURS QUERY | Search_OVERTIME HOURS (EMPLOYEE CODE, START DATE, AND END DATE) |
| WORKING HOURS DATA QUERY | Search_WORKING HOURS (EMPLOYEE CODE, WORKING DATE, AND BUSINESS ID) |
| ⋮ | ⋮ |

Fig. 9

| INTENT | ID | CONVERSATIONAL SENTENCE INFORMATION | ENTITY INFORMATION ||||
|---|---|---|---|---|---|---|
| | | | ENTITY | START POSITION | END POSITION | ENTITY NAME |
| OVERTIME HOURS QUERY INTENT | 1 | TELL ME THE OVERTIME HOURS LAST MONTH OF NAKAMURA. | NAKAMURA | 1 | 2 | EMPLOYEE ENTITY |
| | | | LAST MONTH | 4 | 5 | DATE ENTITY |
| | | | OVERTIME HOURS | 7 | 10 | OVERTIME WORK ENTITY |
| | 2 | TELL ME THE OVERTIME HOURS OF NAKAMURA LAST MONTH. | LAST MONTH | 1 | 2 | DATE ENTITY |
| | | | NAKAMURA | 4 | 5 | EMPLOYEE ENTITY |
| | | | OVERTIME HOURS | 7 | 10 | OVERTIME WORK ENTITY |
| | 3 | TELL ME THE OVERTIME HOURS OF NAKAMURA. | NAKAMURA | 1 | 2 | EMPLOYEE ENTITY |
| | | | OVERTIME HOURS | 4 | 7 | OVERTIME WORK ENTITY |
| | 4 | TELL ME THE OVERTIME HOURS LAST MONTH. | LAST MONTH | 1 | 2 | DATE ENTITY |
| | | | OVERTIME HOURS | 4 | 7 | OVERTIME WORK ENTITY |
| | 5 | TELL ME THE OVERTIME HOURS. | OVERTIME HOURS | 1 | 4 | OVERTIME WORK ENTITY |
| WORKING HOURS DATA QUERY INTENT | 1 | TELL ME THE WORKING HOURS FOR THE MATTER A YESTERDAY OF ICHIRO NAKAMURA. | NAKAMURA | 1 | 4 | EMPLOYEE ENTITY |
| | | | YESTERDAY | 6 | 7 | DATE ENTITY |
| | | | MATTER A | 9 | 11 | BUSINESS ENTITY |
| | | | WORKING HOURS | 13 | 16 | WORKING HOURS ENTITY |
| | 2 | TELL ME THE WORKING HOURS YESTERDAY FOR THE MATTER A OF ICHIRO NAKAMURA. | ⋮ | ⋮ | ⋮ | ⋮ |
| | ⋮ | ⋮ | ⋮ | ⋮ | ⋮ | ⋮ |

Fig. 10

| ENTITY NAME | ENTITY |
|---|---|
| EMPLOYEE ENTITY | ICHIRO NAKAMURA |
| | JIRO OTSUKA |
| | ⋮ |
| DATE ENTITY | LAST MONTH |
| | YESTERDAY |
| | ⋮ |
| OVERTIME WORK ENTITY | OVERTIME HOURS |
| | OVERTIME WORK |
| | ⋮ |
| BUSINESS ENTITY | MATTER A |
| | MATTER B |
| | ⋮ |
| WORKING HOURS ENTITY | WORKING HOURS |
| | DUTY |
| | ⋮ |
| ⋮ | ⋮ |

Fig. 11

| ID | ENTITY MAPPING INFORMATION | | |
|---|---|---|---|
| | TABLE IDENTIFIER | TRANSLATION ITEM NAME | ENTITY NAME |
| 1 | MST_SHAIN | SHAIN_NAME | EMPLOYEE ENTITY |
| 2 | TRN_TIME_CARD | TIME_CARD_DATE | DATE ENTITY |
| 3 | TRN_TIME_CARD | ZIKANGAI_TIME | OVERTIME WORK ENTITY |
| 4 | MST_GYOUMU | GYOUMU_ID | BUSINESS ENTITY |
| ⋮ | ⋮ | ⋮ | ⋮ |

| ID | PK ITEM ||
|---|---|---|
| | TABLE IDENTIFIER | MAIN KEY IDENTIFIER |
| 1 | MST_SHAIN | SHAIN_CODE |
| 2 | TRN_TIME_CARD | SHAIN_CODE |
| 3 | TRN_TIME_CARD | TIME_CARD_DATE |
| 4 | MST_GYOUMU | GYOUMU_ID |
| ⋮ | ⋮ | ⋮ |

INFORMATION OUTPUT DEVICE, INFORMATION OUTPUT METHOD, AND INFORMATION OUTPUT PROGRAM

TECHNICAL FIELD

The present invention relates to an information output device, an information output method, and an information output program.

BACKGROUND ART

Conventionally, for information search on a database in an organization, for example, a technique of creating a dedicated program or obtaining information from the database using a search tool and outputting the information has been used.

Recently, there has been a technique that searches on the Internet and turns on and off a predetermined device by words brought out by a user (for example, see Non-Patent Document 1).

Non-Patent Document 1: "Siri", [online], Apple Inc., [searched on May 17, 2019], Internet [URL: https://www.apple.com/jp/siri/]

DISCLOSURE OF THE INVENTION

Problems to be Solved by the Invention

However, even when inquiries demanding the same search result are made, a conversational sentence (may be referred to as a natural language sentence) dynamically changes depending on, for example, a person who brings out the conversational sentence and an organization where a person belongs to, such as a company. For example, there are many patterns of conversational sentences to inquire about overtime hours in a specific month of a specific employee, such as "Tell me the overtime hours last month of Nakamura." and "Tell me the overtime hours of Ichiro Nakamura last month." It has been difficult for the prior art as described above to receive the conversational sentences that dynamically change even for an inquiry demanding the same search result and search information.

Therefore, the present invention has been invented in consideration of the above-described problem, and an object of the present invention is to provide an information output device that can output an appropriate search result even when a conversational sentence demanding the same search result dynamically changes.

Solutions to the Problems

An information output device according to a first invention includes conversational sentence reception means, parameterization means, intent determination means, search result acquisition means, and search result output means. The conversational sentence reception means receives a conversational sentence. The parameterization means parameterizes one or more entities included in one or more of the conversational sentences received by the conversational sentence reception means. The intent determination means determines an intent that includes an action name identifying a processing operation corresponding to the conversational sentence based on information determining an intent associated with one or more corpora prepared preliminarily. The search result acquisition means searches a database via an API using information as a parameter to acquire a search result, the information being acquired by the parameterization means and for executing business processing identified with the intent determined by the intent determination means. The search result output means outputs the search result acquired via the search result acquisition means. The parameterization means parameterizes an entity corresponding to conversational sentence information that is most approximate to the conversational sentence received by the conversational sentence reception means among one or more pieces of conversational sentence information corresponding to the intent determined by the intent determination means.

An information output method executed by a computer according to a second invention includes: a conversational sentence receiving step of receiving a conversational sentence; a parameterizing step of parameterizing one or more entities included in one or more of the conversational sentences received in the conversational sentence receiving step; an intent determination step of determining an intent that includes an action name identifying a processing operation corresponding to the conversational sentence based on information determining an intent associated with one or more corpora prepared preliminarily; a search result acquiring step of searching a via an API using information as a parameter to acquire a search result, the information being acquired in the parameterizing step and for executing business processing identified with the intent determined in the intent determination step; and a search result output step of outputting the search result acquired via the search result acquiring step. The parameterizing step includes parameterizing an entity corresponding to conversational sentence information that is most approximate to the conversational sentence received in the conversational sentence receiving step among one or more pieces of conversational sentence information corresponding to the intent determined in the intent determination step.

An information output program according to a third invention causes a computer to perform: a conversational sentence receiving step of receiving a conversational sentence; a parameterizing step of parameterizing one or more entities included in one or more of the conversational sentences received in the conversational sentence receiving step; an intent determination step of determining an intent that includes an action name identifying a processing operation corresponding to the conversational sentence based on information determining an intent associated with one or more corpora prepared preliminarily; a search result acquiring step of searching a database via an API using information as a parameter to acquire a search result, the information being acquired in the parameterizing step and for executing business processing identified with the intent determined in the intent determination step; and a search result output step of outputting the search result acquired via the search result acquiring step. The parameterizing step includes parameterizing an entity corresponding to conversational sentence information that is most approximate to the conversational sentence received in the conversational sentence receiving step among one or more pieces of conversational sentence information corresponding to the intent determined in the intent determination step.

Effects of the Invention

According to the above-described inventions, one or more of the entities included in one or more of the conversational sentences received by the conversational sentence reception means is parameterized. Thus, even when the conversational sentence demanding the same search result dynamically changes, the appropriate search result can be output.

BRIEF DESCRIPTION OF THE DRAWINGS

FIG. 5 is a data structure diagram of table information.

FIG. 6 is a data structure diagram of an intent.

FIG. 7 is a diagram illustrating an example of content of each piece of API information.

FIG. 8 is a diagram illustrating an example of content of an API information storage unit.

FIG. 9 is a diagram illustrating an example of content of a corpus storage unit.

FIG. 10 is a diagram illustrating an example of one or more entities corresponding to each entity name.

FIG. 11 is a data structure diagram of entity mapping information.

DESCRIPTION OF PREFERRED EMBODIMENTS

Figure 1:
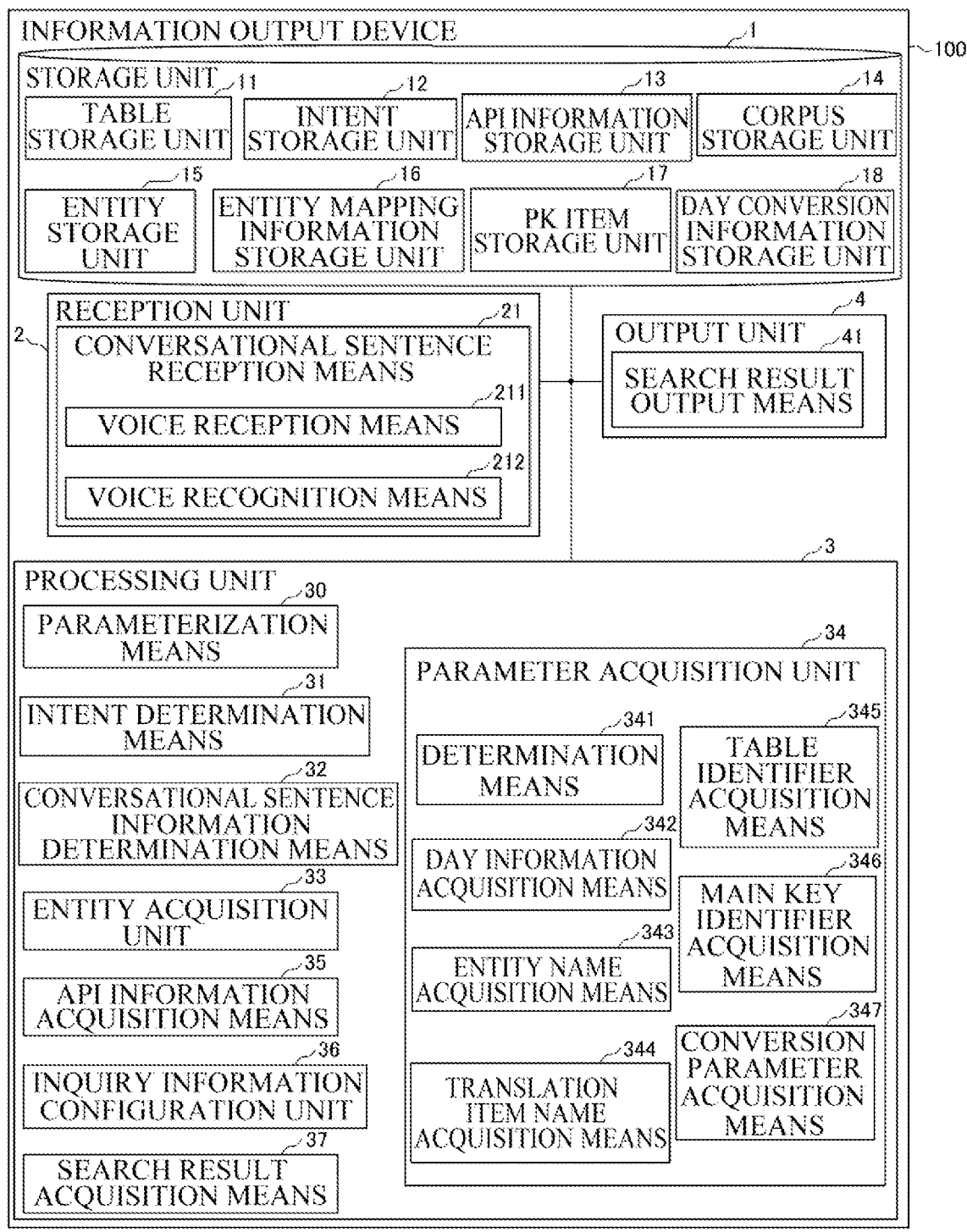
FIG. 1 is a block diagram of an information output device in an embodiment.

The following will describe one example of an information output device and the like in embodiments of the present invention with reference to the drawings. Note that components with the same reference numerals in the embodiments perform similar operations, and therefore the repeated descriptions will be omitted in some cases.

The information output device in the embodiments is, for example, a server. For example, the server is a server in a company that provides a service, such as information search, the server may be, for example, a cloud server and an ASP server, and any type of the server may be used. The server is communicatively connected to one or two or more terminals (not illustrated) via, for example, a network, such as LAN and the Internet, and a wireless or wired communication line. The terminal is, for example, a mobile terminal of a user who uses a service, such as information search, but may be, for example, a stationary PC, and any type of the terminal may be used. The mobile terminal is, for example, a tablet terminal, a smart phone, a mobile phone, and a notebook PC, but the mobile terminal is not limited to them.

However, the information output device may be, for example, a stand-alone terminal, and means to achieve it is not limited to them. FIG. 1 is a block diagram of an information output device 100 in an embodiment. The information output device 100 includes a storage unit 1, a reception unit 2, a processing unit 3, and an output unit 4. The storage unit 1 includes a table storage unit 11, an intent storage unit 12, an API information storage unit 13, a corpus storage unit 14, an entity storage unit 15, an entity mapping information storage unit 16, a PK item storage unit 17, and a day conversion information storage unit 18. The reception unit 2 includes conversational sentence reception means 21. The conversational sentence reception means 21 includes voice reception means 211 and voice recognition means 212.

The processing unit 3 includes parameterization means 30, intent determination means 31, conversational sentence information determination means 32, an entity acquisition unit 33, a parameter acquisition unit 34, API information acquisition means 35, an inquiry information configuration unit 36, and search result acquisition means 37. The parameter acquisition unit 34 includes determination means 341, day information acquisition means 342, entity name acquisition means 343, translation item name acquisition means 344, table identifier acquisition means 345, main key identifier acquisition means 346, and conversion parameter acquisition means 347. The output unit 4 includes search result output means 41.

The storage unit 1 is a database that stores various kinds of information. The various kinds of information include, for example, a table, an intent, API information, a corpus, an entity, entity mapping information, a PK item, and day conversion information. The information, such as the table, will be described later. Other pieces of information will be described as necessary.

The table storage unit 11 stores one or two or more tables. The table, for example, may be a database in a table format. One or two or more item names are registered with the table, and further one or two or more values are registered for each of the one or more item names. The item name may be referred to as an attribute name, or each of one or more values corresponding to one item name may be referred to as an attribute value. The table is, for example, a table of a relational database, a TSV, an excel, and a CSV, but the type of the table is not limited to them.

The table to be stored is, specifically, for example, an employee master, a business master, and a working hours table. Master data regarding an employee is registered with the employee master. The master data regarding the employees is, for example, data, such as an employee code and an employee name, but the type of the master data is not limited to them. Master data regarding a business is registered with the business master. The master data regarding the businesses is, for example, data, such as a business ID, and a business name, but the type of the data is not limited to them.

Data regarding working hours is registered with the working hours table. The data regarding working hours is, for example, variable data, such as a date, overtime hours, total working hours, and a business ID, but the type of the data is not limited to them. Note that the total working hours is a sum of the working hours until a fixed time and the overtime hours.

Usually, the data regarding the working hours as described above associated with the employee code is registered with the working hours table. However, the information associated with the data regarding the working hours may be, for example, an employee name, and any information may be used as long as an employee can be identified.

The intent storage unit 12 stores one or two or more intents. The intent is information managed for each piece of business processing. The management for each piece of business processing may be, for example, storage of the intent associated with information identifying the business processing in the intent storage unit 12. Note that the information identifying the business processing is usually an action name described later, but the format is not limited to this. The association includes, for example, a case where the intent includes the information identifying the business processing.

The business processing is processing regarding a business. The business may be, for example, referred to as a job carried out in an organization, such as a company and an institution. The business is, for example, a duty until a fixed time, an overtime work after the fixed time, a leave, an absence, a matter A, a matter B, an accounting, and a production, but the type of the business is not limited to them. The business processing is, for example, information search. Note that the search may be referred to as, for example, a query. The information to be searched is, for example, attendance information, such as overtime hours and working hours, but may be, for example, financial information, such as a balance and a stock price, or an operating situation of a manufacturing line, and the information is not limited to them.

However, the business processing may be, for example, information registration, processing based on information (for example, salary calculation based on attendance information and financial transaction based on financial information), or the like, and the business processing is not limited to them.

The intent usually includes the action name identifying the business processing. The action name is a name of an action. The action is usually business processing performed via an API. However, the action may be, for example, business processing performed according to a SQL sentence.

Note that usually the action name is also associated with the API information described later. Accordingly, it may be considered that the intent is, for example, associated with the API information via the action name.

The intent usually includes an intent name. The intent name is a name of the intent. Accordingly, the intent can be considered to include information that associates the intent name or the intent identified by the intent name with the action name or the action identified by the action name.

Specifically, the action name is, for example, "overtime hours query" and "working hours data query", but may be any information as long as the business processing can be identified.

The API information storage unit 13 stores one or two or more pieces of API information. The API information is information regarding an API. The API is an interface to use a function of a program. The API is, for example, a function, a method, or software, such as an execution module. The API is, for example, WebAPI, but may be an API other than that. The WebAPI is an API configured using a protocol for Web communication, such as HTTP and HTTPS. Note that the API, such as WebAPI, is the publicly-known technique, and therefore the detailed description thereof will be omitted.

The API information is information associated with the intent. As described above the API information is, for example, associated with the intent via the action name.

The API information is usually information for information search. However, the API information may be, for example, information to perform information registration or to perform processing based on the information.

The API information includes one or two or more pieces of parameter identification information. The parameter identification information is information identifying a parameter. The parameter may be referred to as a value having a specific attribute. The value is usually a variable. The variable may be referred to as an argument.

The parameter is usually information of a converted entity, but may be an entity itself. The parameter is, for example, an argument provided to the API or a variable of the SQL sentence.

The parameter may be constituted of, for example, a set of an attribute name and a value. The set of the attribute name and the value is, specifically, for example, "shain_code=2", and "sta_date=20190401, end_date=20190430", but the format is not limited to them.

The parameter identification information is, for example, a parameter name. The parameter name is a name of the parameter. Alternatively, the parameter identification information is, for example, an attribute name, but may be any information as long as the parameter can be identified.

The API information is, for example, a method. The method is, for example, "search_overtime hours (employee code=$1, start date=$2, end date=$3)" and "search_business hours (employee code=$1, working date=$2, business ID=$3)" but the format is not limited to them. Note that the method is publicly-known, and therefore the detailed description thereof will be omitted.

Alternatively, the API information may be, for example, a SQL sentence. The SQL sentence may be referred to as a sentence to inquire a database. The SQL sentence is, for example, "select_overtime hours_from_table name=$1_where_employee code=$2, business date=$3", but the structure is not limited to them. Note that the SQL sentence is publicly-known, and therefore the detailed description thereof will be omitted.

Alternatively, the API information may be, for example, a set of URL and a method, and the structure is not limited to them. The set of the URL and the method is, specifically, for example, "http://develop.soppra . . . ?employee code=$1&start date=$2&end date=$3", but the format is not limited to them. Note that this type of API information may be referred to as, for example, Web API information.

The corpus storage unit 14 stores one or two or more pieces of conversational sentence information. The conversational sentence information is information on a conversational sentence. The conversational sentence information is usually an example sentence of a conversational sentence. The example sentence is, for example, "Tell me the overtime hours last month of Nakamura." and "Tell me the working hours for the matter A yesterday of Nakamura.", but the example sentence is not limited to them.

However, the conversational sentence information may be a template of the conversational sentence. The template is, for example, "Tell me {overtime work entity} of {date entity} of {employee entity}." and "Tell me {working hours entity} of {business entity} of {date entity} of {employee entity}.", but the format is not limited to them. Note that the information expressed by "{", "}", such as {employee entity}, included in the template may be referred to as, for example, a variable. The entity and the entity name, such as "employee entity", will be described later.

The conversational sentence information is usually associated with the intent. That is, the corpus storage unit 14 stores, for example, one or two or more pieces of conversational sentence information for each of one or more intents stored in the intent storage unit 12 (see FIG. 9: described later).

The corpus storage unit 14 usually stores one or two or more pieces of entity information for each of one or more pieces of stored conversational sentence information. The entity information is information on each of one or more entities associated with one piece of conversational sentence information. When the conversational sentence information is an example sentence, the entity information includes, for example, an entity, a start position, an end position, and an entity name.

The entity that the entity information includes is a representative value among one or two or more entities corresponding to the entity name that the entity information includes. The representative value is, for example, the head entity among one or more entities corresponding to one entity name, but may be any entity.

The start position is a position where the entity starts in the conversational sentence information. For example, the start position is expressed by a value (for example, "1" and "4") indicative of the order of the first character of the entity in a character string constituting the conversational sentence. Similarly, the end position is a position where the entity ends in the conversational sentence information, and, for example, is expressed by a value (for example, "2" and "5") indicative of the order of the last character of the entity. However, the expression formats of the start position and the end position are not limited to them. Note that the start position and the end position may be referred to as offsets. The offset may be expressed by the number of bytes and is not limited to this.

The entity name is a name of the entity. The entity name is, for example, "employee entity", "date entity", and "overtime hours entity", but the format is not limited to them as long as the attribute of the entity can be expressed by the information. The employee entity is an entity regarding an employee. The date entity is an entity regarding a date. The overtime hours entity is an entity regarding the overtime hours.

Additionally, when the conversational sentence information is a template, the entity information may include, for example, the entity name and order information. The order information is a value indicating of the entity name corresponding to the order of the variable among one or more variables included in the template. However, the structure of the entity information is not limited to this.

The corpus storage unit 14 may store, specifically, for example, the conversational sentence information "Tell me the overtime hours last month of Nakamura." and three pieces of entity information corresponding to this, "Nakamura, 1, 2, employee entity", "last month, 4, 5, date entity", and "overtime hours, 7, 10, overtime work entity".

Note that the corpus in the embodiment may be considered as, for example, each of one or more pieces of conversational sentence information stored in the corpus storage unit 14, or can be considered as a collection of one or more pieces of conversational sentence information and the entity information associated with each piece of the conversational sentence information.

The entity storage unit 15 stores one or two or more entities. The entity is each one or two or more words associated with the conversational sentence information. The word is a unit constituting a sentence. The word may be, for example, simply referred to as a "term" or a "phrase" and may be considered as one kind of a morpheme (for example, an independent word described later).

The entity storage unit 15, for example, stores one or two or more entities associated with each of one or more entity names.

The entity is usually associated with any one or two or more pieces of conversational sentence information among one or more pieces of conversational sentence information stored in the corpus storage unit 14. Accordingly, for example, the entity storage unit 15 may store one or two or more entities for each of one or more pieces of conversational sentence information stored in the corpus storage unit 14.

The word associated with the conversational sentence information is usually the independent word. The independent word is a term that can constitute a clause alone, and is, for example, a noun, but may be a verb, an adjective, and the like. However, the associated word may be an attached word. The attached word is a term that cannot constitute a clause alone, but constitutes a clause accompanied by another independent word, and examples of which include an auxiliary verb and a postpositional particle. That is, the associated word is usually the independent word, but may be an independent word accompanied by an attached word.

The associated word may be, for example, a compound word. The compound word is a term representing certain meaning by connecting two or more independent words and may be referred to as a compound. The compound word is, for example, "overtime hours" as a combination of "overtime" and "hours" and "matter A" as a combination of "matter" and "A", but may be a set of a first name and a last name, such as "Ichiro Nakamura" and may be any compound word as long as the compound word is a set of two or more terms.

Note that when the conversational sentence information is an example sentence, the associated word is each of one or two or more words included in the example sentence (that is, information in the conversational sentence information). However, when the conversational sentence information is a template, the associated word is a word (that is, information to be added to the conversational sentence information) that should be inserted into a position of each of one or two or more variables included in the template.

The entity mapping information storage unit 16 stores one or two or more pieces of entity mapping information. The entity mapping information may be referred to as information that associates a table identifier and a translation item name with an entity name.

The entity mapping information includes, for example, the table identifier, the translation item name, and the entity name. The table identifier is information that identifies each of one or more tables stored in the table storage unit 11. The table identifier is, for example, "MST_SHAIN" and "TRN_TIME_CARD", but may be any information as long as the table can be identified.

The translation item name is an attribute name in a table identified by the table identifier and information that identifies the converted entity. The converted entity is an entity converted into a parameter (for example, the entity "Ichiro Nakamura" converted into the parameter "shain_code=1" and the entity "last month" converted into the parameter "sta_date=20190401, end_date=20190430").

The translation item name is, for example, an item name corresponding to a key other than the main key among one or more item names that the table identified by the table identifier includes, and may be an item name converted into the item name corresponding to the main key. The item name corresponding to the main key is, for example, a main key identifier.

The translation item name is, for example, "SHAIN_CODE" and "TIME_CARD_DATE", but may be any information as long as the converted entity can be identified.

The PK item storage unit 17 stores one or two or more PK items. The PK item is an item corresponding to the main key. The PK item includes, for example, the table identifier and the main key identifier. The main key identifier is information identifying the main key of the table identified by the table identifier.

For example, with the table identified by the table identifier "MST_SHAIN" (hereinafter, an employee master), the main key identifier is "SHAIN_CODE", and with the table identified by the table identifier "TRN_TIME_CARD" (hereinafter, a working hours table), the main key identifiers are two, "SHAIN_CODE" and "TIME_CARD_DATE".

The day conversion information storage unit 18 stores one or two or more pieces of day conversion information. The day conversion information is information to convert a day word into a date. The day word is a word regarding a day. The day word is usually a word associated with the entity name, "date entity", and, for example, "last month", "yesterday", "last week", "this year", "this month", "last year", "previous period", and "the current year", but may be any information as long as the information can be converted into a date.

The day conversion information includes a day word and day information acquisition information. The day information acquisition information is information to acquire day information. The day information is information on a day corresponding to a day word and is information used to constitute inquiry information. The day information may be, for example, information indicative of a date, such as "April 1", may be information indicative of a period from a start date until an end date, such as "4/1 to 4/30", and is not limited to them. The day information acquisition information is, for example, a function name or a method name, but may be API information and a program itself, or is not limited to them.

Specifically, for example, the day information acquisition information for the day word "last month" may be a program or the like that acquires current time information (for example, "11:15 on May 10, 2019": the same applies to the following), acquires the month (for example, "April") previous month of the month that the current time information includes (for example, "May"), and acquires the day information (for example, "4/1 to 4/30") from the first day until the last day of the previous month with reference to calendar information of the previous month.

The day information acquisition information for the day word "this year" may be, for example, API information in which the current time information is acquired, the calendar information of the year (for example, "2019") that the current time information includes is referred to, and day information (for example, "2019/1/1 to 2019/5/10") from the first day of the year until the day that the current time information includes is acquired.

Furthermore, the day information acquisition information for the day word "yesterday" may be, for example, a method that acquires the current time information and acquires the day information (for example, "5/9") of the previous day of the day that the current time information includes or its method name.

The reception unit 2 receives various kinds of information. The various kinds of information are, for example, the conversational sentence. While the reception unit 2 receives information, such as a conversational sentence, from, for example, the terminal, may receive the information via an input device, such as a keyboard, a touchscreen, and a microphone. Alternatively, the reception unit 2 may, for example, receive information read from a recording medium, such as a disk and a semiconductor memory, and the aspect of the reception is not especially limited.

The conversational sentence reception means 21 receives a conversational sentence. The conversational sentence is a sentence conversated by a person, and may be referred to as a sentence by a natural language. The conversational sentence is received with, for example, voice, but may be received with text. The voice is a voice brought out by a person. The text is a character string as a result of voice recognition of a voice brought out by a person. The character string is constituted of an array of one or two or more characters.

The voice reception means 211 receives the voice of the conversational sentence. For example, while the voice reception means 211 receives the voice of the conversational sentence paired with a terminal identifier from the terminal, the voice reception means 211 may receive the voice via the microphone. The terminal identifier is information that identifies the terminal. The terminal identifier is, for example, a MAC address, an IP address, and an ID, but may be any information as long as the terminal can be identified. Note that the terminal identifier may be a user identifier that identifies the user of the terminal. The user identifier is, for example, an e-mail address and a telephone number, but may be, for example, an ID and an address/name, and may be any information as long as the user can be identified.

The voice recognition means 212 performs a voice recognition process on the voice received by the voice reception means 211 and acquires a conversational sentence as a character string. Note that the voice recognition process is the publicly-known technique and therefore the detailed description thereof will be omitted.

The processing unit 3 performs various kinds of processes. The various kinds of processes are, for example, processes, such as the parameterization means 30, the intent determination means 31, the conversational sentence information determination means 32, the entity acquisition unit 33, the parameter acquisition unit 34, the API information acquisition means 35, the inquiry information configuration unit 36, the search result acquisition means 37, the determination means 341, the day information acquisition means 342, the entity name acquisition means 343, the translation item name acquisition means 344, the table identifier acquisition means 345, the main key identifier acquisition means 346, and the conversion parameter acquisition means 347. The various kinds of processes include, for example, various kinds of determinations that will be described in the flowchart.

The processing unit 3, for example, performs a process, such as the parameterization means 30 and the intent determination means 31, in response to the reception of the conversational sentence by the conversational sentence reception means 21. Note that when the conversational sentence is transmitted paired with the terminal identifier from each of one or more terminals, the processing unit 3 performs a process, such as the intent determination means 31, on each of one or more terminal identifiers.

The parameterization means 30 parameterizes one or more entities included in one or more conversational sentences received by the conversational sentence reception means 21. Note that the parameterization means 30 may parameterize the entity corresponding to the conversational sentence information determined by the conversational sentence information determination means 32.

Specifically, the parameterization means 30 parameterizes the entity, an independent word as one example, included in the conversational sentence input as the voice. For example, comparing the conversational sentence "Tell me the overtime hours last month of Otsuka." with the conversational sentence "Tell me the overtime hours of Otsuka last month.", except that the words "of Otsuka" and "last month" are switched, there is no difference between the two conversational sentences. In spite of this, there was a case in which they were recognized as the conversational sentences having different meanings and were not always recognized the same semantic content in the search result up to the present. Therefore, the parameterization means 30 parameterizes the independent words, "Otsuka", "last month", and "overtime hours", namely, entities, included in the conversational sentences.

The intent determination means 31 determines the intent corresponding to the conversational sentence received by the conversational sentence reception means 21.

Specifically, the intent determination means 31, first, for example, acquires the text corresponding to the conversational sentence received by the conversational sentence reception means 21. As described above, for example, the text is a result of voice recognition of the conversational sentence received by the conversational sentence reception means 21, but may be the conversational sentence itself received by the conversational sentence reception means 21.

That is, when the conversational sentence as the voice is received, the intent determination means 31 performs voice recognition on the conversational sentence to acquire the text. Note that when the conversational sentence as the text is received, the intent determination means 31 only needs to acquire the text.

Next, the intent determination means 31 performs, for example, morphological analysis on the acquired text to acquire one or more independent words from the text. Note that the morphological analysis is the publicly-known technique and therefore the detailed description thereof will be omitted.

Then, the intent determination means 31 determines the intent including the action name including a word same as or similar to the acquired one or more independent words.

Specifically, for example, the storage unit 1 stores a synonym dictionary. The synonym dictionary is a dictionary regarding synonyms. The word that the action name includes and one or two or more of synonyms of the word are registered with the synonym dictionary for each action name constituting each of one or more intents stored in the intent storage unit 12. Specifically, for example, "overtime" and "hours outside the operating hours" may be associated with the word "overtime hours" that the action name "overtime hours query" includes and may be registered.

For example, when the conversational sentence reception means 21 receives the conversational sentence "Tell me the overtime hours last month of Otsuka.", the intent determination means 31 acquires one or more independent words, such as "Otsuka", "last month", and "overtime hours", from the conversational sentence, searches the intent storage unit 12 with each independent word as the key, and determines whether the intent that includes the action name matching the independent word is present. Note that the match is, for example, exact match, but may be partial match. When the intent that includes the action name identifying the processing operation and including the word matching the independent word is present, the intent determination means 31 determines the intent. In this example, there is the intent that includes the action name "overtime hours reference" that includes the word "overtime hours" matching the independent word "overtime hours", and therefore the intent is determined.

Note that when there is no intent including the action name including the word matching the independent word, for example, the intent determination means 31 acquires one synonym among one or more synonyms corresponding to the independent word from the synonym dictionary, searches the intent storage unit 12 with the one synonym as the key, and determines whether the intent that includes the action name including the word matching the one synonym is present. When the intent that includes the action name including the word matching the one synonym is present, the intent determination means 31 determines the intent. When the intent is absent, the intent determination means 31 performs a similar process on another synonym and determines the intent. When the intent is absent in any synonym, the intent determination means 31 may output that the intent is undetermined.

The conversational sentence information determination means 32 searches the corpus storage unit 14 with the intent determined by the intent determination means 31 as the key, and determines the conversational sentence information that is the most approximate to the conversational sentence received by the conversational sentence reception means 21 among one or more pieces of conversational sentence information corresponding to the intent.

The conversational sentence information that is most approximate to the conversational sentence is, for example, the conversational sentence information having the highest degree of similarity to the conversational sentence. That is, the conversational sentence information determination means 32, for example, calculates the degree of similarity between the received conversational sentence and each of one or more pieces of conversational sentence information corresponding to the determined intent and determines conversational sentence information having the maximum degree of similarity.

Alternatively, the conversational sentence information determination means 32, for example, may search a conversation template that matches the template in which the position of the noun in the received conversational sentence is a variable. That is, the corpus storage unit 14 stores the template in which each of one or two or more entity names is a variable. The conversational sentence information determination means 32 acquires the position of each of one or two or more entity names in the received conversational sentence and determines the template corresponding to the position of the acquired entity name as the conversational sentence information. Note that the position of each of one or more entity names in the conversational sentence is information indicative of the order of the entity name in the template including each of one or more entity names.

The entity acquisition unit 33 acquires one or more entities that correspond to each of one or more entities associated with the conversational sentence information determined by the conversational sentence information determination means 32 and is the word included in the conversational sentence received by the conversational sentence reception means 21.

The entity acquisition unit 33, for example, acquires the start position and the end position of the entity for each of one or more entities associated with the determined conversational sentence information from the corpus storage unit 14, and acquires the word identified by the start position and the end position among the received conversational sentence.

Specifically, as described above, for example, the corpus storage unit 14 stores the conversational sentence information "Tell me the overtime hours last month of Nakamura." and the three pieces of entity information corresponding to this, "Nakamura, 1, 2, employee entity", "last month, 4, 5, date entity", and "overtime hours, 7, 10, overtime work entity". When the conversational sentence reception means 21 receives the conversational sentence "Tell me the overtime hours last month of Otsuka." and the conversational sentence information determination means 32 determines the conversational sentence information "Tell me the overtime hours last month of Nakamura.", the entity acquisition unit 33 acquires the word "Otsuka" identified by the start position "1" and the end position "2" that the first entity information has, the word "last month" identified by the start position "4" and the end position "5" that the second entity information has, and the word "overtime hours" identified by the start position "7" and the end position "10" that the third entity information includes from the received conversational sentence "Tell me the overtime hours last month of Otsuka."

The parameter acquisition unit 34 acquires one or more parameters corresponding to each of one or more entities acquired by the entity acquisition unit 33.

The acquired parameter is, for example, the acquired entity itself, but may be information that is a conversion of the acquired entity. That is, for example, when the day word is included in the acquired one or more entities, the parameter acquisition unit 34 converts the day word into the day information as the parameter.

The determination means 341 constituting the parameter acquisition unit 34 determines whether the day word is present in one or more entities acquired by the entity acquisition unit 33. Specifically, for example, the storage unit 1 stores one or two or more day words, the determination means 341 determines whether each of the acquired one or more entities matches any of the stored day words, and when the determination result of at least one entity indicates the match, it is determined that the day word is present among the acquired one or more entities.

When the determination means 341 determines that the day word is present in the acquired one or more entities, the day information acquisition means 342 acquires day conversion information corresponding to the day word from the day conversion information storage unit 18, and acquires the day information as the parameter using the day conversion information.

Specifically, for example, when the storage unit 1 stores the day word, for example, "last month", the conversational sentence "Tell me the overtime hours last month of Otsuka." is received, and the three entities, "Otsuka", "last month", and "overtime hours" are acquired, the determination means 341 determines that the day word is present among the acquired three entities because the entity "last month" matches the day word "last month". For example, the current time information is acquired, and the day information (for example, "4/1 to 4/30") is acquired.

The day information acquisition means 342 acquires day information acquisition information (for example, a program) corresponding to the day word "last month" from the day conversion information storage unit 18. Then, using the day information acquisition information, the day information acquisition means 342 acquires the current time information (for example, "11:15 on May 10, 2019") from a timepiece built into a Micro Processing Unit (MPU), an NTP server, or the like and acquires the month (for example, "April") previous month of the month (for example, "May") that the current time information includes. Then, the day information acquisition means 342 refers to the calendar information of the previous month and acquires the day information "April 1 to April 30" from the first day until the last day of the previous month.

Note that when the day word acquired from the conversational sentence is "this year", the day information acquisition means 342 acquires the day information acquisition information (for example, the API information) corresponding to the day word "this year" from the day conversion information storage unit 18. Then, using the day information acquisition information, the day information acquisition means 342 acquires the current time information from, for example, the built-in timepiece, refers to the calendar information of the year (for example, "2019") that the current time information has, and acquires the day information (for example, "1/1/2019 to 5/10/2019") from the first day of the year until the day that the current time information includes.

When the acquired day word is "yesterday", the day information acquisition means 342 acquires the day information acquisition information (for example, the method) corresponding to the day word "yesterday" from the day conversion information storage unit 18. Using the day information acquisition information, the day information acquisition means 342 acquires the current time information from the built-in timepiece or the like and acquires the day information (for example, "5/9") the previous day of the day that the current time information includes.

The entity name acquisition means 343 acquires the entity name corresponding to the entity for each of one or more entities acquired by the entity acquisition unit 33 from the entity storage unit 15.

The entity name corresponding to the entity is an entity name paired with the start position and the end position that match or are similar to the position of the entity corresponding to the entity in the conversational sentence from which the entity is acquired. For example, the entity name acquisition means 343 may acquire the entity name corresponding to the entity from the entity storage unit 15 for each of one or more entities acquired by the entity acquisition unit 33 using the entity information associated with the entity.

Specifically, for example, when the three entities, "Otsuka", "last month", and "overtime hours" are acquired from the received conversational sentence "Tell me the overtime hours last month of Otsuka.", the entity name acquisition means 343 acquires the "employee entity" associated with "Nakamura" using the first entity information having the same start position "1" and end position "2" as "Otsuka" in the received conversational sentence "Tell me the overtime hours last month of Otsuka." among the three pieces of entity information stored associated with the conversational sentence information in the conversational sentence information "Tell me the overtime hours last month of Nakamura." stored in the corpus storage unit 14.

Additionally, the entity name acquisition means 343, for example, acquires the "date entity" associated with "last month" using the second entity information having the same start position "4" and end position "5" as "last month" in the conversational sentence "Tell me the overtime hours last month of Otsuka." among the three pieces of entity information. Furthermore, the entity name acquisition means 343 acquires the "overtime hours entity" associated with "overtime hours" using the third entity information having the same start position "7" and end position "10" as "overtime hours" in the conversational sentence "Tell me the overtime hours last month of Otsuka."

The translation item name acquisition means 344, for example, acquires the translation item name paired with the entity name for each of one or more entity names acquired by the entity name acquisition means 343 from the entity mapping information storage unit 16.

Specifically, when the entity mapping information storage unit 16, for example, stores entity mapping information 1 that includes the table identifier "MST_SHAIN", the translation item name "SHAIN_NAME", and the entity name "employee entity", entity mapping information 2 that includes the table identifier "TRN_TIME_CARD", the translation item name "TIME_CARD_DATE", and the entity name "date entity", and entity mapping information 3 that includes the table identifier "TRN_TIME_CARD", the translation item name "ZIKANGAI_TIME", and the entity name "overtime work entity", and the entity name acquisition means 343 acquires the three entity names, "employee entity", "date entity", and "overtime work entity", the translation item name acquisition means 344 uses the three pieces of entity mapping information 1 to 3 and acquires the translation item name "SHAIN_NAME" paired with the entity name "employee entity", the translation item name "TIME_CARD_DATE" paired with the entity name "date entity", and the translation item name "ZIKANGAI_TIM" paired with "overtime work entity".

The table identifier acquisition means 345 acquires the table identifier paired with the entity name for each of one or more entity names acquired by the entity name acquisition means 343 from the entity mapping information storage unit 16.

Specifically, using the three pieces of the entity mapping information 1 to 3, the table identifier acquisition means 345, for example, acquires the table identifier "MST_SHAIN" paired with the entity name "employee entity", the table identifier "TRN_TIME_CARD" paired with the entity name "date entity", and the table identifier "TRN_TIME_CARD" paired with the entity name "overtime work entity".

The main key identifier acquisition means 346 acquires the main key identifier paired with the table identifier acquired by the table identifier acquisition means 345 from the PK item storage unit 17.

Specifically, the PK item storage unit 17 stores, for example, a PK item 1 that includes the table identifier "MST_SHAIN" and the main key identifier "SHAIN_CODE", a PK item 2 that includes the table identifier "TRN_TIME_CARD" and the main key identifier "SHAIN_CODE", a PK item 3 that includes the table identifier "TRN_TIME_CARD" and the main key identifier "TIME_CARD_DATE", and a PK item 4 that includes the table identifier "MST_GYOUMU" and the main key identifier "GYOUMU_ID". The main key identifier acquisition means 346 acquires the main key identifier "SHAIN_CODE" paired with the table identifier "MST_SHAIN", the main key identifier "SHAIN_CODE" paired with the table identifier "TRN_TIME_CARD", the main key identifier "TIME_CARD_DATE" paired with the table identifier "TRN_TIME_CARD", and the main key identifier "GYOUMU_ID" paired with the table identifier "MST_GYOUMU" using the PK items 1 to 4.

The conversion parameter acquisition means 347 acquires the converted parameter in which the attribute value of the translation item name acquired by the translation item name acquisition means 344 is the attribute value included in the record that matches the entity acquired by the entity acquisition unit 33 and the attribute value of the main key identifier acquired by the main key identifier acquisition means 346 from the table identified by the table identifier acquired by the table identifier acquisition means 345.

Specifically, the conversion parameter acquisition means 347 acquires the converted parameter "shain_code=2" in which the attribute value of the acquired translation item name "SHAIN_NAME" is the attribute value included in the record that matches the acquired entity "Otsuka" and the attribute value of the acquired main key identifier "SHAIN_CODE" from the employee master identified by the acquired table identifier "MST_SHAIN".

The conversion parameter acquisition means 347 acquires the converted parameter "shain_code=2, sta_date=20190401, end_date=20190430" in which the attribute values of the two acquired translation item names "TIME_CARD_DATE" and "SHAIN_NAME" are the attribute values included in the record that matches the entity "April 1 to April 30" as the conversion of the acquired entity "last month" and the acquired entity "Otsuka" and the attribute values of the two acquired main key identifiers "SHAIN_CODE" and "TIME_CARD_DATE" from the working hours table identified by the acquired table identifier "TRN_TIME_CARD".

The API information acquisition means 35 acquires the API information corresponding to the intent determined by the intent determination means 31 from the API information storage unit 13.

The API information acquisition means 35, for example, acquires the API information that includes the action name corresponding to the intent determined by the intent determination means 31 from the API information storage unit 13.

Specifically, the API information storage unit 13, for example, stores the API information 1 that includes, for example, the action name "overtime hours query" and three or more pieces of parameter identification information "employee code, shain_code", "start date, sta_date", and "end date, end_date", and the API information 2 that includes, for example, the action name "working hours data query" and three or more pieces of parameter identification information "employee code, shain_code", "working date, time_card_date", and "business ID, gyoumu_id". When the intent identified by the intent name "overtime work query intent" is acquired, the API information acquisition means 35 acquires the API information 1 that includes the action name "overtime hours query" that the intent includes.

The inquiry information configuration unit 36 constitutes the inquiry information using one or more parameters acquired by the parameter acquisition unit 34 and the API information acquired by the API information acquisition means 35. The inquiry information is information for information search and is usually executable information. The inquiry information is, for example, a function into which an argument is inserted or a method, but may be a completed SQL sentence or may be a set of URL and a parameter.

The inquiry information configuration unit 36, for example, arranges the parameter as the parameter associated with each position and acquired by the parameter acquisition unit 34 at each position of one or more variables that the API information acquired by the API information acquisition means 35 includes to constitute the inquiry information.

Specifically, for example, the inquiry information "https://develop.soppra . . . ?shain_code=2&sta_date=20190401&end_date=20190430" in which "shain_code=2", "sta_date=20190401", and "end_date=20190430" are arranged at the respective positions of three or more variables that the acquired API information 1 includes may be constituted.

The search result acquisition means 37 performs the inquiry information configured by the inquiry information configuration unit 36 and searches the storage unit 1 (the database) using the parameter acquired by the parameterization means 30 to acquire the search result. For example, the inquiry information "https://develop.soppra . . . ?shain_code=2&sta_date=20190401&end_date=20190430" may be performed, and the overtime hours "0401=1,0402=0, . . . 4030=2" corresponding to each date from April 1 until April 30 of the employee "Jiro Otsuka" identified by the employee code 2 may be acquired. Additionally, the search result acquisition means 37 may generate the API information including the parameter acquired by the parameterization means 30 and search the storage unit 1 (the database)

based on the generated API information. That is, by newly writing the parameter or rewriting a new parameter over the already written parameter, the API information may be generated and the database may be searched based on the API information to which the parameter is reflected. Note that the information for inquiry, such as the API information and the SQL, and detailed operations of the search result acquisition means 37 will be described in specific examples and modifications.

The output unit 4 outputs various kinds of information. The various kinds of information are, for example, the search result.

The output unit 4, for example, transmits the information, such as the search result, as the result of performing various kinds of processes by the processing unit 3 in response to the reception of the information, such as the conversational sentence, paired with the terminal identifier by the reception unit 2 to the terminal identified by the terminal identifier. Alternatively, for example, in response to the reception unit 2 receiving the information, such as the conversational sentence, via the input device, such as the touchscreen and the microphone, the output unit 4 may output the information, such as the search result, via the output device, such as a display and a speaker.

However, the output unit 4 may print various kinds of information by, for example, a printer, accumulate it in the recording medium, deliver it to another program, or transmit it to an external device, and the aspect of output is not especially limited.

The search result output means 41 outputs the acquired e search result via the search result acquisition means 37. The search result output means 41, for example, transmits the search result acquired by the search result acquisition means 37 in response to the reception of the conversational sentence paired with the terminal identifier by the conversational sentence reception means 21 to the terminal identified by the terminal identifier. Alternatively, the search result output means 41, for example, may output the search result acquired by the search result acquisition means 37 in response to the reception of the conversational sentence via the input device, such as the microphone, by the conversational sentence reception means 21 via an output device, such as a display and a speaker.

The storage unit 1, the table storage unit 11, the intent storage unit 12, the API information storage unit 13, the corpus storage unit 14, the entity storage unit 15, the entity mapping information storage unit 16, the PK item storage unit 17, and the day conversion information storage unit 18 are, for example, preferably a non-volatile memory, such as a hard disk and a flash memory, but may be achievable by a volatile recording medium, such as a RAM.

The process that the storage unit 1 or the like stores the information is not especially limited. For example, the storage unit 1 or the like may store the information via the recording medium, the storage unit 1 or the like may store the information transmitted via, for example, a network and a communication line, or the storage unit 1 or the like may store the information input via the input device. Any input device, such as a keyboard, a computer mouse, a touchscreen, and a microphone, may be used.

The reception unit 2, the conversational sentence reception means 21, the voice reception means 211, and the voice recognition means 212 may be considered to include the input device or may be considered not to include the input device. The reception unit 2 or the like can be achieved by driver software of the input device or the input device and driver software thereof.

The processing unit 3, the intent determination means 31, the conversational sentence information determination means 32, the entity acquisition unit 33, the parameter acquisition unit 34, the API information acquisition means 35, the inquiry information configuration unit 36, the search result acquisition means 37, the determination means 341, the day information acquisition means 342, the entity name acquisition means 343, the translation item name acquisition means 344, the table identifier acquisition means 345, the main key identifier acquisition means 346, and the conversion parameter acquisition means 347 can be usually achieved by, for example, a Central Processing Unit (CPU), an MPU, and a memory. The process procedure of the processing unit 3 or the like is usually achieved by software, and the software is recorded in a recording medium, such as a ROM. However, the process procedure may be achieved by hardware (a dedicated circuit).

The output unit 4 and the search result output means 41 may be considered to include the output device, such as the display and the speaker, or may be considered not to include the output device. The output unit 4 or the like can be achieved by driver software of the output device or the output device and driver software thereof.

Note that a reception function of the reception unit 2 or the like is usually achieved by wireless or wired communicating means (for example, a communication module, such as a network interface controller (NIC) and a modem), but may be achieved by means to receive broadcast (for example, a broadcast reception module). A transmission function of the output unit 4 or the like is usually achieved by wireless or wired communicating means, but may be achieved by broadcast means (for example, a broadcast module).

Figure 3:
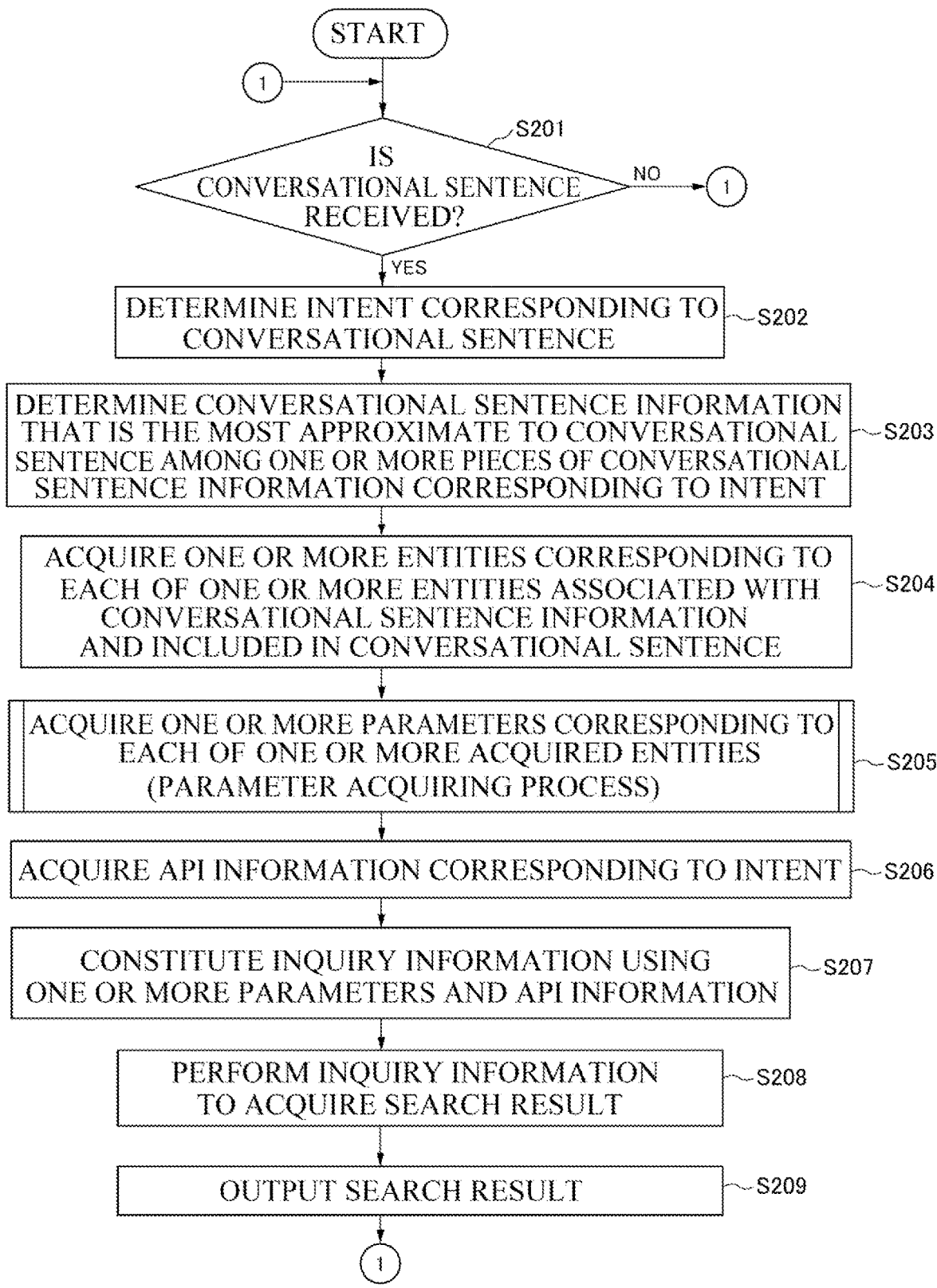
FIG. 3 is a flowchart describing another operation of the information output device.
Figure 4:
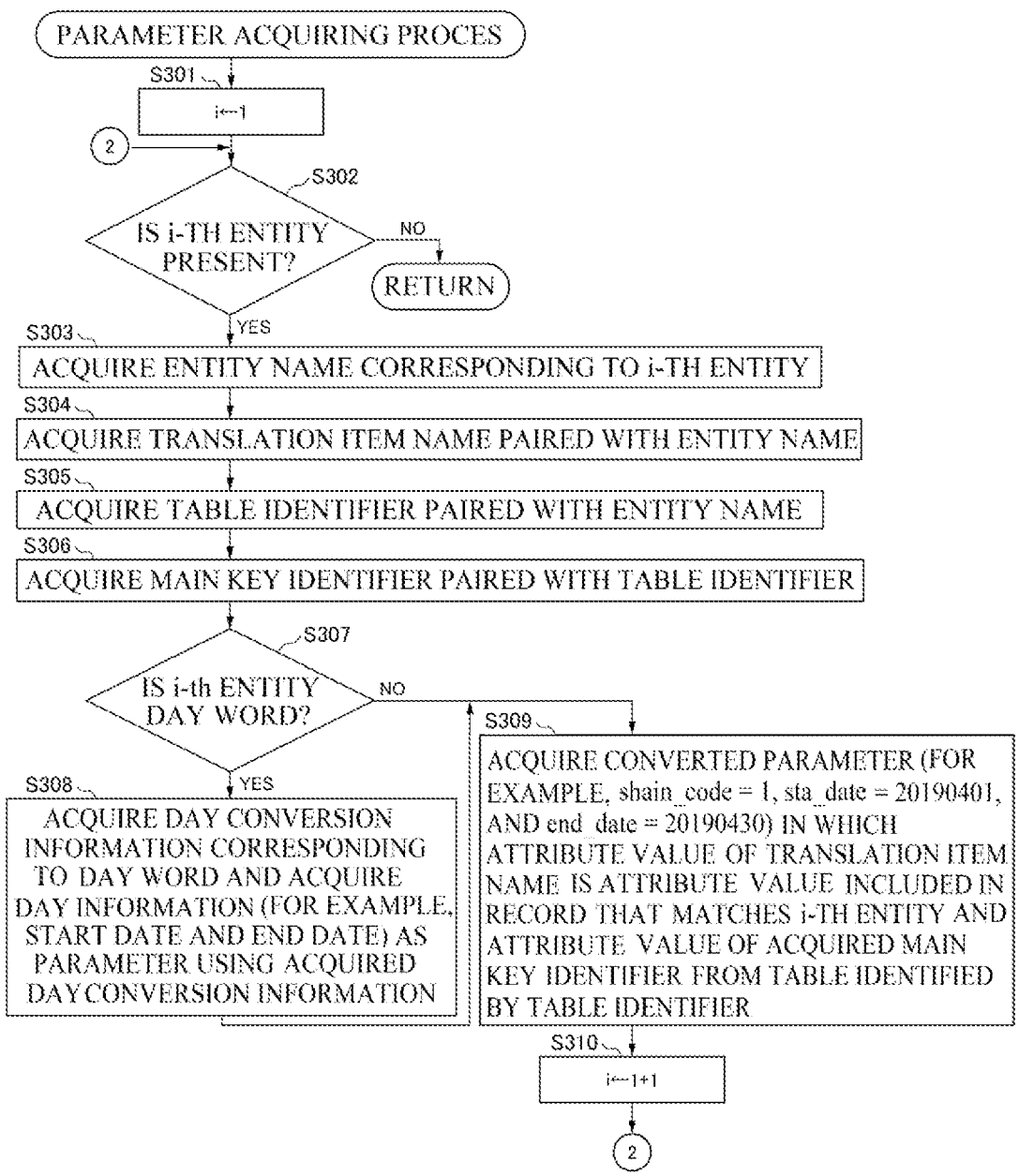
FIG. 4 is a flowchart describing a parameter acquiring process.

Next, operations of the information output device 100 will be described by referring to the flowcharts in FIG. 2 to FIG. 4. Note that the processes depicted in FIG. 2 to FIG. 4 are achieved by reading programs stored in the storage medium, such as an HDD and a non-volatile memory (for example, a flash memory), by the processor, such as the CPU and the MPU.

Figure 2:
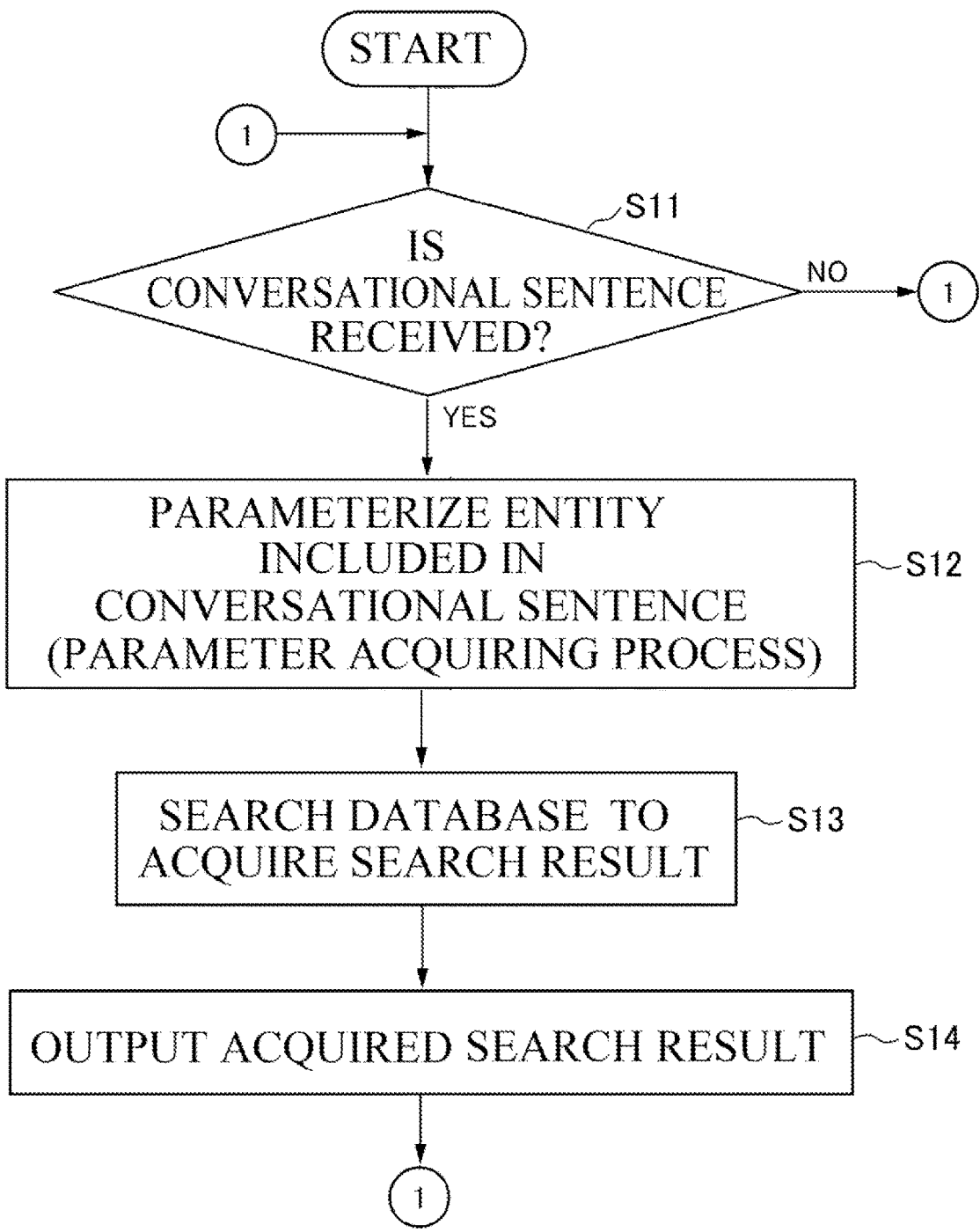
FIG. 2 is a flowchart describing an operation of the information output device.

FIG. 2 is a flowchart describing the operation of the information output device 100. Note that when the conversational sentence paired with the terminal identifier is transmitted from each of one or more terminals, the flowcharts in FIG. 2 to FIG. 4 are performed for each of one or more terminal identifiers.

(Step S11) The processing unit 3 determines whether the conversational sentence reception means 21 receives the conversational sentence. When the conversational sentence reception means 21 is determined to receive the conversational sentence, the process proceeds to Step S12, and when the conversational sentence reception means 21 is determined not to receive the conversational sentence, the process returns to Step S11.

(Step S12) The parameterization means 30 parameterizes the entity included in the conversational sentence. That is, the parameterization means 30 acquires the entity from the conversational sentence and acquires the parameter corresponding to the acquired entity.

(Step S13) The search result acquisition means 37 searches the database to acquire the search result.

(Step S14) The search result output means 41 outputs the search result acquired at Step S13. Afterwards, the process returns to Step S11.

FIG. 3 is a flowchart describing another operation of the information output device 100.

(Step S201) The processing unit 3 determines whether the conversational sentence reception means 21 receives the conversational sentence. When the conversational sentence reception means 21 is determined to receive the conversational sentence, the process proceeds to Step S202, and when the conversational sentence reception means 21 is determined not to receive the conversational sentence, the process returns to Step S201.

(Step S202) The intent determination means 31 determines the intent corresponding to the conversational sentence received at Step S201 among one or more intents stored in the intent storage unit 12.

(Step S203) The conversational sentence information determination means 32 determines the conversational sentence information that is the most approximate to the conversational sentence received at Step S201 among one or more pieces of conversational sentence information corresponding to the intent determined at Step S202.

(Step S204) The entity acquisition unit 33 acquires one or more entities corresponding to each of one or more entities associated with the conversational sentence information determined at Step S203 and included in the conversational sentence received at Step S201 from the entity storage unit 15.

(Step S205) The parameter acquisition unit 34 performs a process (hereinafter referred to as a parameter acquiring process in some cases) that acquires one or more parameters corresponding to each of one or more entities acquired at Step S204. Note that the parameter acquiring process will be described with reference to FIG. 4.

(Step S206) The API information acquisition means 35 acquires the API information corresponding to the intent determined at Step S202 from the API information storage unit 13.

(Step S207) The inquiry information configuration unit 36 constitutes the inquiry information using one or more parameters acquired at Step S205 and the API information acquired at Step S206.

(Step S208) The search result acquisition means 37 performs the inquiry information constituted at Step S207 to acquire the search result.

(Step S209) The search result output means 41 outputs the search result acquired at Step S208. Afterwards, the process returns to Step S201.

Note that in the flowchart in FIG. 3, the process starts in response to turning on a power source of the information output device 100 and start of the program, and the process ends by turning off the power source and an interrupt of processing termination. However, a trigger to start or end the processing is not especially limited.

FIG. 4 is a flowchart describing the parameter acquiring process at Step S205.

(Step S301) The parameter acquisition unit 34 sets an initial value 1 to a variable i. The variable i is a variable to select the entities that are not selected in sequence among one or two or more entities acquired at Step S204.

(Step S302) The parameter acquisition unit 34 determines whether the i-th entity is present. When the i-th entity is determined to be present, the process proceeds to Step S303, and when the i-th entity is determined to be absent, the process returns to an upper process.

(Step S303) The entity name acquisition means 343 acquires the entity name corresponding to the i-th entity from the entity storage unit 15.

(Step S304) The translation item name acquisition means 344 acquires the translation item name paired with the entity name acquired at Step S303 from the entity mapping information storage unit 16.

(Step S305) The table identifier acquisition means 345 acquires the table identifier paired with the entity name acquired at Step S303 from the entity mapping information storage unit 16.

(Step S306) The main key identifier acquisition means 346 acquires the main key identifier paired with the table identifier acquired at Step S305 from the PK item storage unit 17.

(Step S307) The determination means 341 determines whether the i-th entity is the day word. When the i-th entity is determined to be the day word, the process proceeds to Step S308, and when the i-th entity is determined not to be the day word, the process proceeds to Step S309.

(Step S308) The day information acquisition means 342 acquires the day conversion information corresponding to the day word from the day conversion information storage unit 18 and acquires the day information (for example, the start date and the end date) as the parameter using the acquired day conversion information.

(Step S309) The conversion parameter acquisition means 347 acquires the converted parameter (for example, Shain_code=1, sta_date=20190401, and end_date=20190430) in which the attribute value of the translation item name is the attribute value included in the record that matches the i-th entity and the attribute value of the main key identifier acquired at Step S306 from the table identified by the table identifier acquired at Step S305.

(Step S310) The parameter acquisition unit 34 increments the variable i. Afterwards, the process returns to Step S302.

The following will describe a specific operation example of the information output device 100 in the embodiment. Note that in the following description, various kinds of changes are possible and do not limit the scope of the present invention.

As illustrated in FIG. 5, for example, the table storage unit 11 in the information output device 100 stores three pieces of table information. FIG. 5 is a data structure diagram of the table information. The table information has the table identifier and the table. An ID (for example, "1" and "2") is associated with each piece of the stored table information.

For example, the table information corresponding to the ID "1" (hereinafter described as table information 1 in some cases) includes the table identifier "MST_SHAIN" and a first table (the employee master). For example, the first item name "SHAIN_CODE" and two or more values corresponding to it "1", "2" . . . , and the second item name "SHAIN_CODE" and two or more values corresponding to it, "Ichiro Nakamura", "Jiro Otsuka" . . . , and the like are registered with the employee master.

Table information 2 corresponding to the ID "2" includes the table identifier "MST_GYOUMU" and a second table (the business master). The first item name "GYOUMU_ID" and two or more values corresponding to it, "a", "b" . . . , and the second item name "GYOUMU_NAME" and two or more values corresponding to it, "matter A", "matter B" . . . , and the like are registered with the business master.

Furthermore, the table information 3 includes the table identifier "TRN_TIME_CARD", and the third table (the working hours table). For example, the first item name "TRN_TIME_CARD" and two or more values corresponding to it, "4/1", "4/1" . . . "4/2", "4/2" . . . "4/30", "4/30" . . . , the second item name "SHAIN_CODE" and two or more values corresponding to it, "1", "2" ... "1", "2" ... "1", "2", the third item name "ZIKANGAI_TIME" and two or more values corresponding to it, "2", "1" ... "1", "0" ... "3", "2", the fourth item name "TOTAL_TIME" and two or more values corresponding to it "10", "9" ... "9", "8" ... "11", "10", and the fifth item name "GYOUMU_ID" and two or more values corresponding to it "a", "b" ... "a", "b" ... "b", "b" are registered with the working hours table.

For example, the intent storage unit 12 stores the two or more intents as illustrated in FIG. 6. FIG. 6 is a data structure diagram of the intent. The intent includes the intent name and the action name. The ID (for example, "1" and "2") are associated with each of the stored intents.

For example, the intent 1 corresponding to the ID "1" includes the intent name "overtime hours query intent" and the action name "overtime hours query". The intent 2 includes the intent name "working hours data query intent" and the action name "working hours data query".

An example of API information will be shown with reference to FIG. 7. FIG. 7 illustrates the API information based on the three types of conversational sentences. Each piece of the API information is constituted of information (search_overtime hours) indicative of the process content and one or more parameters (for example, an employee and a date) acquired based on the entity. For example, when the conversational sentence inquiries about the overtime hours and the conversational sentence at least includes the employee and the word (the entity) related to the date, the entity regarding the employee as the first parameter and the entity regarding the date as the second parameter are written to the API information. Note that the parameters are not limited to the employee and the date, and may be registered with any other entity.

The conversational sentence received by the conversational sentence reception means possibly changes each time, that is, possibly dynamically changes. Specifically, the API information corresponding to the ID 1 requests the overtime hours of the date 1 of the employee 1 and the API information indicated in the ID 2 requests the overtime hours of the date 2 of the employee 1. When the ID 1 is compared with the ID 2, they differ in that the overtime hours of the different dates of the same employee are requested. In this case, the second parameter equivalent to the date is changed. Similarly, when the ID 1 is compared with the ID 3 in FIG. 7, they differ in that the overtime hours of the different employees of the same date are requested. In this case, the first parameter equivalent to the employee is changed. Thus, as a result the dynamic change in the conversational sentence, since the change in the parameter used as the condition to perform the API also rewrites the content of the API information, the search result that can be acquired changes according to this.

For example, the API information storage unit 13 stores a collection of a pair of the action name and the API information as illustrated in FIG. 8. FIG. 8 is a diagram illustrating an example of the content in the API information storage unit 13. The pair of the action name and the API information is, for example, a pair of the action name "overtime hours query" and the API information "search_overtime hours (employee code, start date, and end date)" and a pair of the action name "working hours data query" and the API information "search_working hours (employee code, working date, and business ID)".

For example, as illustrated in FIG. 9, the corpus storage unit 14 stores one or two or more pieces of conversational sentence information associated with each of one or more intents. Furthermore, the corpus storage unit 14 stores one or two or more pieces of entity information associated with each of one or more pieces of the conversational sentence information. FIG. 9 is a diagram illustrating an example of the content in the corpus storage unit 14. The entity information includes the entity, the start position, the end position, and the entity name.

For example, five pieces of conversational sentence information 1 to 5 are associated with the first intent "overtime hours query intent". Among them, the conversational sentence information 1 is "Tell me the overtime hours last month of Nakamura.", the conversational sentence information 2 is "Tell me the overtime hours of Nakamura last month.", the conversational sentence information 3 is "Tell me the overtime hours of Nakamura.", the conversational sentence information 4 is "Tell me the overtime hours last month.", and the conversational sentence information 5 is "Tell me the overtime hours."

First entity information that includes the entity "Nakamura", the start position "1", the end position "2", and the entity name "employee entity", second entity information that includes the entity "last month", the start position "4", the end position "5", and the entity name "date entity", and third entity information that includes the entity "overtime hours", the start position "7", the end position "10", and the entity name "overtime work entity" are associated with the conversational sentence information 1 associated with "overtime hours query intent".

Fourth entity information that includes the entity "last month", the start position "1", the end position "2", and the entity name "date entity", fifth entity information that includes the entity "Nakamura", the start position "4", the end position "5", and the entity name "employee entity", and sixth entity information that includes the entity "overtime hours", the start position "7", the end position "10", and the entity name "overtime work entity" are associated with the conversational sentence information 2.

Seventh entity information that includes the entity "Nakamura", the start position "1", the end position "2", and the entity name "employee entity", and eighth entity information that includes the entity "overtime hours", the start position "4", the end position "7", and the entity name "overtime work entity" are associated with the conversational sentence information 3.

Ninth entity information that includes the entity "last month", the start position "1", the end position "2", and the entity name "date entity", and tenth entity information that includes the entity "overtime hours", the start position "4", the end position "7", and the entity name "overtime work entity" are associated with the conversational sentence information 4.

Furthermore, eleventh entity information that includes the entity "overtime hours", the start position "1", the end position "4", and the entity name "overtime work entity" are associated with the conversational sentence information 5.

Meanwhile, for example, 15 pieces of conversational sentence information 1 to 15 are associated with the second intent "working hours data query intent". Among them, the conversational sentence 1 is "Tell me the working hours for the matter A yesterday of Ichiro Nakamura.", the conversational sentence 2 is "Tell me the working hours yesterday for the matter A of Ichiro Nakamura.", and the last conversational sentence 15 is "Tell me the working hours." Note that the conversational sentence 2 or later is a sentence whose word orders are changed or a part of words are omitted from the conversational sentence 1.

The first entity information that includes the entity "Ichiro Nakamura", the start position "1", the end position "4", and the entity name "employee entity", the second entity information that includes the entity "yesterday", the start position "6", the end position "7", and the entity name "date entity", and the third entity information that includes the entity "working hours", the start position "13", the end position "16", and the entity name "working hours entity" are associated with the conversational sentence information 1 associated with "working hours data query intent". Note that one or more pieces of entity information that are similarly configured are associated with the respective conversational sentences 2 to 15.

For example, as illustrated in FIG. 10, the entity storage unit 15 stores one or two or more entities associated with each of one or more entity names. FIG. 10 is a diagram illustrating an example of one or more entities (hereinafter described as an entity group in some cases) corresponding to each of the entity names.

For example, the entity group corresponding to the entity name "employee entity" includes, for example, "Ichiro Nakamura" and "Jiro Otsuka". The entity group corresponding to the entity name "date entity" includes, for example, "last month" and "yesterday". The entity group corresponding to the entity name "overtime work entity" includes, for example, "overtime hours" and "overtime work". The entity group corresponding to the entity name "business entity" includes, for example, "matter A" and "matter B". The entity group corresponding to the entity name "working hours entity" includes, for example, "working hours" and "duty".

The entity mapping information storage unit 16 stores, for example, two or more pieces of entity mapping information (entity mapping information 1 to 4 and the like) as illustrated in FIG. 11. FIG. 11 is a data structure diagram of the entity mapping information. The entity mapping information includes the table identifier, the translation item name, and the entity name.

Note that the entity mapping information 1 to 3 have been described above and therefore will not be repeated. The entity mapping information 4 includes the table identifier "MST_GYOUMU", the translation item name "GYOUMU_ID", and the entity name "business entity".

Figures 12, 13:
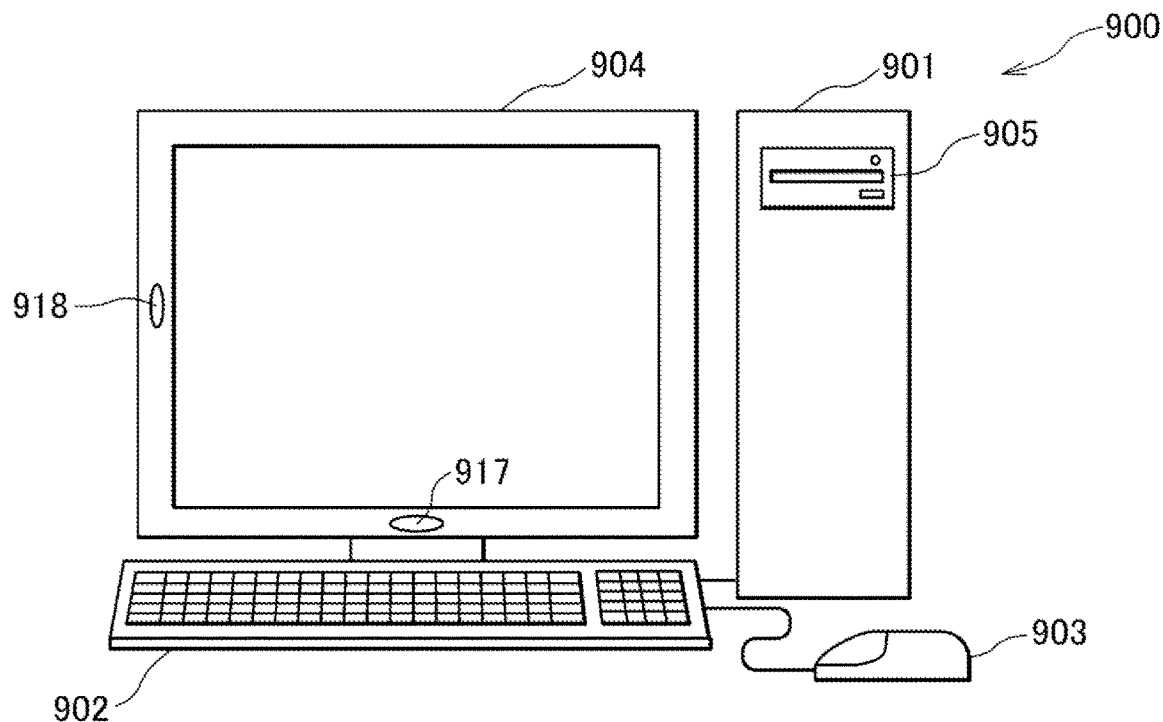
FIG. 12 is a data structure diagram of a PK item.
FIG. 13 is an external view of a computer system.

The PK item storage unit 17, for example, stores the two or more PK items (the PK items 1 to 4 and the like) as illustrated in FIG. 12. FIG. 12 is a data structure diagram of the PK items. The PK item includes the table identifier and the main key identifier. Note that the PK items 1 to 4 have been described above and therefore will not be repeated.

The day conversion information storage unit 18 stores a collection (not illustrated) of a pair of the day word and the day information acquisition information. The pair of the day word and the day information acquisition information is, for example, a pair of the day word "last month" and the day information acquisition information 1 and a pair of the day word "yesterday" and the day information acquisition information 2. For example, the day information acquisition information 1 corresponding to the day word "last month" is a program that acquires the current time information, acquires the previous month of the month that the current time information includes, refers to the calendar information of the previous month, and acquires the day information from the first day until the last day of the previous month. The day information acquisition information 2 corresponding to the day word "yesterday" is a method that acquires the current time information and acquires the day information of the previous day of the day that the current time information includes.

The current time is 11:15 on May 10, 2019. It is assumed that now the user inputs the voice "Tell me the overtime hours last month of Otsuka." to the terminal.

In the information output device 100, the voice reception means 211 receives the voice via the microphone, and the voice recognition means 212 performs the voice recognition process on the voice and acquires the conversational sentence "Tell me the overtime hours last month of Otsuka".

The intent determination means 31 determines the intent corresponding to the conversational sentence among the two or more intents 1, 2 . . . stored in the intent storage unit 12. Specifically, the intent determination means 31, for example, acquires the three independent words, "Otsuka", "last month", and "overtime hours" from the conversational sentence by morphological analysis, searches the intent storage unit 12 with each of the independent words as the key, and determines the intent 1 including the action name "overtime hours reference" that partially matches "overtime hours".

The conversational sentence information determination means 32 refers to the corpus storage unit 14 (FIG. 9) and determines the conversational sentence information that is the most approximate to the conversational sentence among the five pieces of conversational sentence information 1 to 5 corresponding to the determined intent 1. Here, the conversational sentence information 1 in which only the employee entity "Nakamura" identified by the start position "1" and the end position "2" differs and the other entities are same as those of the conversational sentence is determined.

The entity acquisition unit 33 acquires the three entities "Otsuka", "last month", and "overtime hours" included in the conversational sentence and the entities corresponding to the three entities "Nakamura", "last month", and "overtime hours" associated with the determined conversational sentence information 1 from the entity storage unit 15.

Specifically, the conversational sentence information determination means 32 refers to the first entity information among the three pieces of the first to third entity information corresponding to the conversational sentence information 1 and determines that "Otsuka" identified by the start position "1" and the end position "2" in the conversational sentence as the employee entity. Next, the conversational sentence information determination means 32 refers to the entity storage unit 15 and acquires the entity "Jiro Otsuka" that partially matches "Otsuka" from the entity group corresponding to the entity name "employee entity".

Additionally, the conversational sentence information determination means 32 refers to the second entity information, determines that "last month" identified by the start position "4" and the end position "5" in the conversational sentence as the date entity, and acquires the entity "last month" that exactly matches "last month" from the entity group corresponding to the entity name "date entity".

Furthermore, the conversational sentence information determination means 32 refers to the third entity information, determines that "overtime hours" identified by the start position "7" and the end position "10" in the conversational sentence as the overtime work entity, and acquires the entity "overtime hours" that exactly matches "overtime hours" from the entity group corresponding to the entity name "overtime work entity".

Thus, when the three entities corresponding to the conversational sentence, "Jiro Otsuka", "last month", and "overtime hours" are acquired, the parameter acquisition unit 34 acquires the three parameters corresponding to the three entities.

Specifically, first, regarding the first entity "Jiro Otsuka", the entity name acquisition means 343 constituting the parameter acquisition unit 34 acquires the entity name "employee entity" from the entity storage unit 15 using the first entity information. Next, the translation item name acquisition means 344 acquires the translation item name "SHAIN_NAME" paired with the acquired entity name "employee entity" from the entity mapping information storage unit 16 using the entity mapping information 1. The table identifier acquisition means 345 acquires the table identifier "MST_SHAIN" paired with the acquired entity name "employee entity" from the entity mapping information storage unit 16 using the entity mapping information 1.

Next, the main key identifier acquisition means 346 acquires the main key identifier "SHAIN_CODE" paired with the acquired table identifier "MST_SHAIN" from the PK item storage unit 17 using the PK item 1. Additionally, the determination means 341 determines that the first entity "Otsuka" is not the day word. In response to it, the conversion parameter acquisition means 347 acquires the first converted parameter "shain_code=2" in which the attribute value of the translation item name "SHAIN_NAME" is the attribute value included in the record that matches the first entity "Jiro Otsuka" and is the attribute value of the acquired main key identifier "SHAIN_CODE" from the table (the employee master) identified by the acquired table identifier "MST_SHAIN".

Next, regarding the second entity "last month", the entity name acquisition means 343 acquires the entity name "date entity" corresponding to "last month", and the translation item name acquisition means 344 acquires the translation item name "TIME_CARD_DATE" paired with the acquired entity name "date entity" using the entity mapping information 2. The table identifier acquisition means 345 acquires the table identifier "TRN_TIME_CARD" paired with the acquired entity name "date entity" from the entity mapping information storage unit 16 using the entity mapping information 2.

Next, the main key identifier acquisition means 346 acquires the two main key identifiers "SHAIN_CODE" and "TIME_CARD_DATE" paired with the acquired table identifier "TRN_TIME_CARD" using the two PK items 2 and 3. The determination means 341 determines that the second entity "last month" is the day word. In response to this, the day information acquisition means 342 acquires the day conversion information corresponding to the day word "last month" from the day conversion information storage unit 18, and acquires the day information "4/1 to 4/30" using the acquired day conversion information.

Specifically, the day information acquisition means 342 acquires the current time information "11:15 on May 10, 2019" from, for example, the built-in timepiece, refers to the calendar information of April, which is the previous month of "May" that the current time information includes, and acquires the day information "4/1 to 4/30" indicating the 30 days from the start date "4/1" until the end date "4/30".

The conversion parameter acquisition means 347 acquires the converted second and third parameters "sta_date=20190401" and "end_date=20190430" in which the attribute value of the translation item name "TIME_CARD_DATE" is the attribute value included in the record that matches the start date "4/1" and the end date "4/30" corresponding to the second entity "last month" and is the attribute value of the two acquired main key identifiers "SHAIN_CODE" and "TIME_CARD_DATE" from the table (the working hours table) identified by the acquired table identifier "TRN_TIME_CARD".

Next, regarding the third entity "overtime hours", the entity name acquisition means 343 acquires the entity name "overtime work entity" corresponding to "overtime hours", and the translation item name acquisition means 344 acquires the translation item name "ZIKANGAI_TIME" paired with the acquired entity name "overtime work entity" using the entity mapping information 3. Additionally, the table identifier acquisition means 345 acquires the table identifier "TRN_TIME_CARD" paired with the acquired entity name "overtime work entity" using the entity mapping information 3.

Note that the two main key identifiers "SHAIN_CODE" and "TIME_CARD_DATE" paired with the acquired table identifier "TRN_TIME_CARD" have already been acquired, and therefore the main key identifier acquisition means 346 does not usually acquire them, but may acquire them again.

Additionally, the determination means 341 determines that the third entity "overtime hours" is not the day word, and the conversion parameter acquisition means 347 acquires the fourth converted parameter "zikangai_time" corresponding to the translation item name "ZIKANGAI_TIME" that the working hours table identified by the acquired table identifier "TRN_TIME_CARD" includes.

Thus, when the four parameters "shain_code=2", "sta_date=20190401", "end_date=20190430", and "zikangai_time" corresponding to the conversational sentence "Tell me the overtime hours last month of Otsuka." are acquired, the API information acquisition means 35 acquires the API information "search_overtime hours (employee code, start date, and end date)" corresponding to the action name "overtime hours query" that the determined intent 1 includes from the API information storage unit 13.

The inquiry information configuration unit 36 assigns the acquired four parameters for the corresponding variables in the acquired API information "search_overtime hours (employee code, start date, and end date)" to constitute the inquiry information "search_zikangai_time (shain_code=2, sta_date=20190401, end_date=20190430".

The search result acquisition means 37 performs the constituted inquiry information to acquire the search result. Here, from an overtime hours table identified by the table identifier "TRN_TIME_CARD", 30 values "1, 0, . . . 2" corresponding to the item name "ZIKANGAI_TIME" are acquired from the 30 records in which the value of the item name "TIME_CARD_DATE" is "4/1" to "4/30" and the value of SHAIN_CODE is "2", and the search result "20 hours" found by summing the 30 values is acquired.

The search result output means 41 outputs a response sentence including the acquired search result "20 hours". The output response sentence may be, for example, "It is 20 hours." and "The overtime hours in April of Mr. Otsuka is 20 hours". Specifically, for example, the storage unit 1 may store the template for the response sentence, the search result output means 41 assigns, for example, the above-described search result "20 hours", "Otsuka" acquired from the conversational sentence, and "April" acquired in the search process for variables of the template to configure the response sentence.

Note that although the detailed description will be omitted, for the conversational sentence "Tell me the working hours yesterday for the matter A of Jiro Otsuka.", for example, the four parameters "shain_code=2", "time_card_date=20190509", "gyoumu_id=a", and "total_time" may be acquired, and the inquiry information "search_total_time (shain_code=2, time_card_date=20190509, gyoumu_id=a" may be configured.

(Modification 1)

Note that when the API information is the SQL sentence "select_overtime hours_from_table name_where_employee code, business date", the parameter acquisition unit 34 may acquire the four parameters "shain_code=2", time_card_date=20190509", trn_time_card", and "zikangai_time", and the inquiry information configuration unit 36 may configure the inquiry information "select_zikangai_time_from_trn_time_card_where_shain_code=2, time_card_date=20190509".

(Modification 2)

Note that when the API information is a set of URL and a method "http://develop.soppra . . . ?employee code&start date&end date", the parameter acquisition unit 34 may acquire the four parameters "shain_code=2", "sta_date=20190401", "end_date=20190430", and "zikangai_time", and the inquiry information configuration unit 36 may configure the inquiry information "http://develop.soppra . . . ?shain_code=2&sta_date=20190401&end_date=20190430".

According to the present invention having the above-described configuration, one or more entities included in one or more conversational sentences received by the conversational sentence reception means is parameterized. This decomposes the conversation into the minimum units. Therefore, when the words having the same content as meaning and only the orders are different, that is, when the conversational sentence demanding the same search result dynamically changes, it is determined that the conversations themselves have the same content. By searching the database using the parameter acquired by the parameterization means, the search result is acquired. Therefore, even when the conversational sentence demanding the same search result dynamically changes, the appropriate search result can be output.

Furthermore, the process in the embodiment may be achieved by software. The software may be distributed by, for example, software download. The software may be recorded to a recording medium, such as a CD-ROM, and may be spread. Note that the same applies to the other embodiments in this Description.

FIG. 13 is an external view of a computer system 900 in the embodiment that executes a program and achieves the information output device 100. The embodiments of the present invention can be achieved by computer hardware and a computer program executed on the computer hardware. In FIG. 13, the computer system 900 includes a computer 901 that includes a disk drive 905, a keyboard 902, a computer mouse 903, a display 904, a microphone 917, and a speaker 918. Note that the entire system including the keyboard 902, the computer mouse 903, the display 904, the microphone 917, and the speaker 918 may be referred to as a computer.

Figure 14:
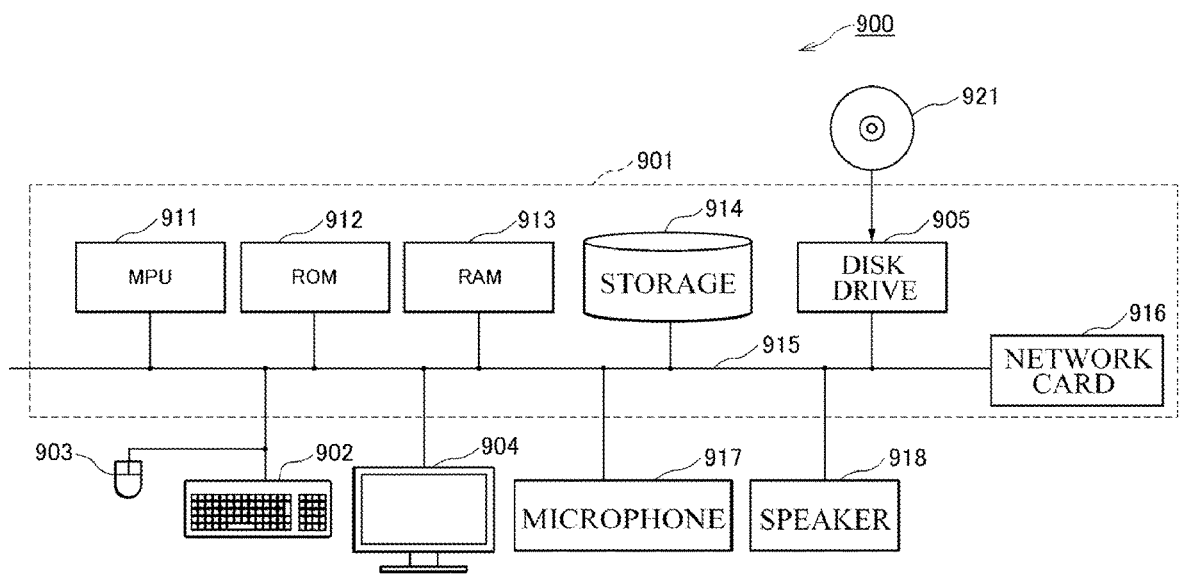
FIG. 14 is a diagram illustrating an example of an internal configuration of the computer system.

FIG. 14 is a diagram illustrating an example of an internal configuration of the computer system 900. In FIG. 14, the computer 901 includes, in addition to the disk drive 905, an MPU 911, a ROM 912 to store a program, such as a boot-up program, a RAM 913 coupled to the MPU 911, temporarily storing an instruction of an application program, and providing a temporary storage space, a storage 914 that stores the application program, a system program, and data, a bus 915 that mutually couples, for example, the MPU 911 and the ROM 912, and a network card 916 that provides connection of, for example, an external network and an internal network to the network. The storage 914 is, for example, a hard disk, an SSD, and a flash memory.

The program that causes the computer system 900 to perform the function of the information output device 100 may be, for example, stored in a disk 921, such as a DVD and a CD-ROM, inserted into the disk drive 905, and transferred to the storage 914. Instead of this, the program may be transmitted to the computer 901 via the network and stored in the storage 914. The program is loaded to the RAM 913 to be executed. Note that the program may be directly loaded from the disk 921 or the network. Instead of the disk 921, the program may be read into the computer system 900 via another attachable/detachable recording medium (for example, a DVD and a memory card).

The program need not necessarily include, for example, an operating system (OS) or a third-party program that causes 901, which indicates the details of the computer, to perform the function of the information output device 100. The program may include only an instruction part that calls appropriate function and module in a controlled aspect such that the desired result can be obtained. How the computer system 900 operates is well-known, and therefore the detailed description thereof will be omitted.

Note that the above-described computer system 900 is a server or stationary PC, but the information output device 100 may be, for example, achieved by a mobile terminal, such as a tablet terminal, a smart phone, and a notebook PC. In this case, for example, the keyboard 902 and the computer mouse 903 may be replaced by a touchscreen, and the disk drive 905 may be replaced by a memory card slot, and the disk 921 may be replaced by a memory card. However, the above-described ones are examples, and the hardware configuration of the computer achieving the information output device 100 is not limited to them.

Note that, in the program, a transmitting step of transmitting information, a receiving step of receiving information, and the like do not include a process performed by hardware, for example, a process performed by, for example, a modem and an interface in the transmitting step (a process performed by only the hardware).

The computer executing the program may be a single or may be plural. That is, a centralized process may be performed or a dispersion process may be performed.

It is obvious that, in the respective embodiments, the two or more communicating means (for example, the reception function of the reception unit 2 and the transmission function of the output unit 4) present in one device may be physically achieved by one medium.

In the respective embodiments, each process (each function) may be achieved by the centralized process by a single device (a system) or may be achieved by the dispersion process by a plurality of devices.

While some embodiments of the present invention have been described, the embodiments have been presented as examples, and are not intended to limit the scope of the invention. The novel embodiments described herein can be embodied in a variety of other configurations. Various omissions, substitutions and changes can be made without departing from the gist of the invention. The embodiments and the modifications thereof are within the scope and the gist of the invention and within the scope of the inventions described in the claims and their equivalents.

DESCRIPTION OF REFERENCE SIGNS

1: Storage unit
11: Table storage unit
12: Intent storage unit
13: API information storage unit 14: Corpus storage unit
15: Entity storage unit
16: Entity mapping information storage unit
17: PK item storage unit
18: Day conversion information storage unit
2: Reception unit
21: Conversational sentence reception means
211: Voice reception means
212: Voice recognition means
3: Processing unit
30: Parameterization means
31: Intent determination means
32: Conversational sentence information determination means
33: Entity acquisition unit
34: Parameter acquisition unit
341: Determination means
342: Day information acquisition means
343: Entity name acquisition means
344: Translation item name acquisition means
345: Table identifier acquisition means
346: Main key identifier acquisition means
347: Conversion parameter acquisition means
35: API information acquisition means
36: Inquiry information configuration unit
37: Search result acquisition means
4: Output unit
41: Search result output means
100: Information output device

The invention claimed is:

1. An information output device comprising:
conversational sentence reception means that receives a conversational sentence;
parameterization means that parameterizes one or more entities included in one or more of the conversational sentences received by the conversational sentence reception means;
intent determination means that determines an intent that includes an action name identifying a processing operation corresponding to the conversational sentence based on information determining an intent associated with one or more corpora prepared preliminarily;
search result acquisition means that searches a database via an API using information as a parameter to acquire a search result, the information being acquired by the parameterization means and for executing business processing identified with the intent determined by the intent determination means; and
search result output means that outputs the search result acquired via the search result acquisition means,
wherein the parameterization means parameterizes an entity corresponding to conversational sentence information that is most approximate to the conversational sentence received by the conversational sentence reception means among one or more pieces of conversational sentence information corresponding to the intent determined by the intent determination means.

2. An information output method executed by a computer, comprising:
a conversational sentence receiving step of receiving a conversational sentence;
a parameterizing step of parameterizing one or more entities included in one or more of the conversational sentences received in the conversational sentence receiving step;
an intent determination step of determining an intent that includes an action name identifying a processing operation corresponding to the conversational sentence based on information determining an intent associated with one or more corpora prepared preliminarily;
a search result acquiring step of searching a database via an API using information as a parameter to acquire a search result, the information being acquired in the parameterizing step and for executing business processing identified with the intent determined in the intent determination step; and
a search result output step of outputting the search result acquired via the search result acquiring step,
wherein the parameterizing step parameterizes an entity corresponding to conversational sentence information that is most approximate to the conversational sentence received in the conversational sentence receiving step among one or more pieces of conversational sentence information corresponding to the intent determined in the intent determination step.

3. A non-transitory computer readable recording medium storing a program that is executable by a computer to cause the computer to perform operations comprising:
a conversational sentence receiving step of receiving a conversational sentence;
a parameterizing step of parameterizing one or more entities included in one or more of the conversational sentences received in the conversational sentence receiving step;
an intent determination step of determining an intent that includes an action name identifying a processing operation corresponding to the conversational sentence based on information determining an intent associated with one or more corpora prepared preliminarily;
a search result acquiring step of searching a database via an API using information as a parameter to acquire a search result, the information being acquired in the parameterizing step and for executing business processing identified with the intent determined in the intent determination step; and
a search result output step of outputting the search result acquired via the search result acquiring step,
wherein the parameterizing step parameterizes an entity corresponding to conversational sentence information that is most approximate to the conversational sentence received in the conversational sentence receiving step among one or more pieces of conversational sentence information corresponding to the intent determined in the intent determination step.

* * * * *